(12) United States Patent
Uehira et al.

(10) Patent No.: US 7,583,080 B2
(45) Date of Patent: Sep. 1, 2009

(54) ROTATION ANGLE DETECTION DEVICE AND ROTATION ANGLE CORRECTION METHOD

(75) Inventors: Kiyotaka Uehira, Osaka (JP); Kouji Oike, Kyoto (JP); Noritaka Ichinomiya, Nara (JP); Kiyotaka Sasanouchi, Osaka (JP); Kouichi Santo, Osaka (JP)

(73) Assignee: Panasonic Corporation, Osaka (JP)

( * ) Notice: Subject to any disclaimer, the term of this patent is extended or adjusted under 35 U.S.C. 154(b) by 259 days.

(21) Appl. No.: 11/813,713

(22) PCT Filed: Feb. 9, 2006

(86) PCT No.: PCT/JP2006/302228

§ 371 (c)(1),
(2), (4) Date: Jul. 11, 2007

(87) PCT Pub. No.: WO2006/085569

PCT Pub. Date: Aug. 17, 2006

(65) Prior Publication Data

US 2009/0021246 A1    Jan. 22, 2009

(30) Foreign Application Priority Data

Feb. 10, 2005  (JP) ............................. 2005-034025
Feb. 28, 2005  (JP) ............................. 2005-052809
Jan. 12, 2006  (JP) ............................. 2006-004519

(51) Int. Cl.
*G01B 7/30* (2006.01)
(52) U.S. Cl. ..................... 324/207.25; 324/207.12; 324/207.21
(58) Field of Classification Search ................. 324/207.12–207.25
See application file for complete search history.

(56) References Cited

U.S. PATENT DOCUMENTS 5,481,188 A * 1/1996 Mizutani ............... 324/207.25
6,630,823 B2 * 10/2003 Tateishi et al. ......... 324/207.25
6,720,762 B2 * 4/2004 Okumura ............... 324/207.21

(Continued)

FOREIGN PATENT DOCUMENTS

JP        63-118614 A     5/1988

(Continued)

OTHER PUBLICATIONS

International Search Report for PCT/JP2006/302228, dated May 16, 2006.

*Primary Examiner*—Jay M Patidar
(74) *Attorney, Agent, or Firm*—RatnerPrestia

(57) ABSTRACT

A device for detecting an absolute rotation angle of multiple rotation with a high accuracy and high resolution by using a target connected to the rotation axis and having an outer circumferential surface to which magnetic poles of alternate polarities are magnetized. The device includes: a first rotor holding a target connected to an input axis and having an outer circumferential surface to which magnetic poles of alternate polarities are magnetized at an identical interval and having a multi-rotatable gear; a second rotor connected to the gear of the first rotor, rotated at a low speed by the first rotor, and having a magnet at the center portion; a first detection unit and a second detection unit for detecting the rotation angles of them. With a simple configuration, it is possible to detect an absolution rotation angle with a high accuracy and a high resolution.

26 Claims, 18 Drawing Sheets

U.S. PATENT DOCUMENTS

| | | | |
|---|---|---|---|
| 6,909,282 B2 * | 6/2005 | Onishi et al. | 324/207.25 |
| 2004/0145364 A1 * | 7/2004 | Onishi et al. | 324/207.2 |
| 2009/0140731 A1 * | 6/2009 | Miyashita et al. | 324/207.25 |

FOREIGN PATENT DOCUMENTS

| | | |
|---|---|---|
| JP | 5-312593 A | 11/1993 |
| JP | 10-227631 A | 8/1998 |
| JP | 11-194007 A | 7/1999 |
| JP | 2002-213910 A | 7/2002 |
| JP | 2002-340618 A | 11/2002 |
| JP | 2002-340619 A | 11/2002 |
| JP | 2005-16968 A | 1/2005 |
| JP | 2005-31011 A | 2/2005 |

* cited by examiner

Output signal (V) vs Rotation angle of second rotor (°), 0 to 62. Curves labeled 229 and 228.

Rotation angle (electrical angle) (°), 0 to 180, vs Rotation angle of second rotor (°), 0 to 62. Line labeled θe214.

FIG. 13A

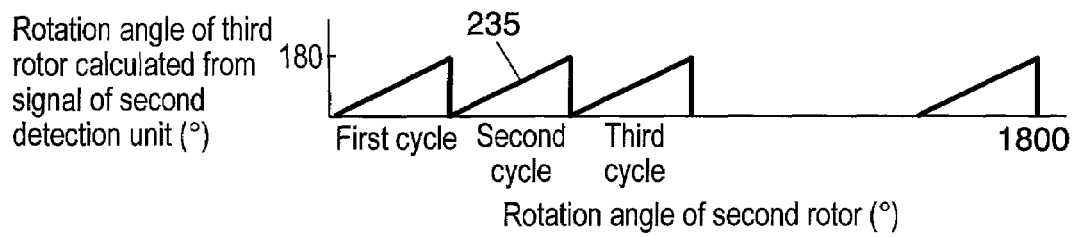

Rotation angle of third rotor calculated from signal of second detection unit (°)

Rotation angle of second rotor (°)

FIG. 13B

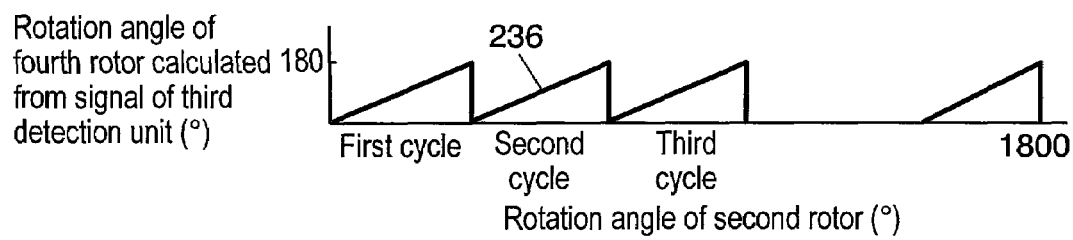

Rotation angle of fourth rotor calculated from signal of third detection unit (°)

Rotation angle of second rotor (°)

FIG. 13C

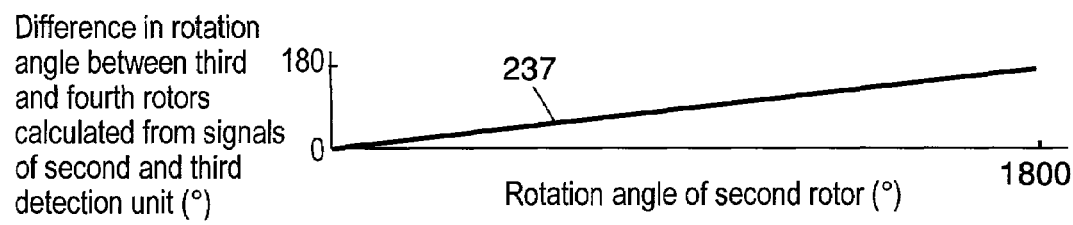

Difference in rotation angle between third and fourth rotors calculated from signals of second and third detection unit (°)

Rotation angle of second rotor (°)

FIG. 13D

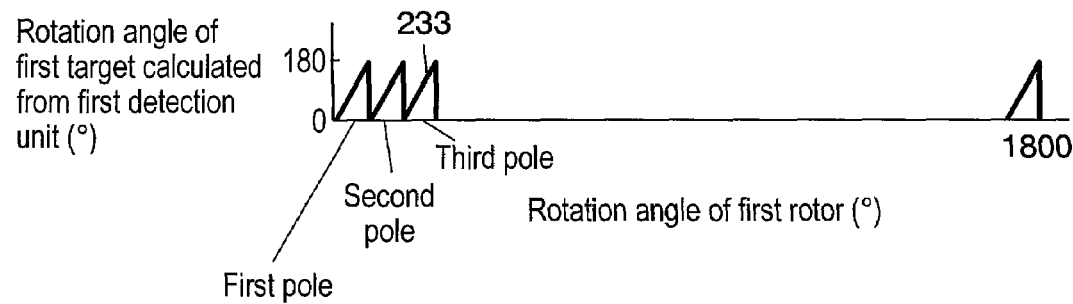

Rotation angle of first target calculated from first detection unit (°)

Rotation angle of first rotor (°)

ROTATION ANGLE DETECTION DEVICE AND ROTATION ANGLE CORRECTION METHOD

This application is a U.S. National Phase Application of PCT International Application PCT/JP2006/302228.

TECHNICAL FIELD

The present invention relates to a rotation angle detection device used in a vehicle body control system, and the like. In particular, it relates to a rotation angle detection device for detecting an absolute rotation angle of a multiple rotation steering wheel and a rotation angle correction method.

BACKGROUND ART

FIG. 26 shows a conventional rotation angle detection device. Gear 38 is attached via engaged spring 39 to a rotation axis (not shown) whose rotation angle is intended to be detected. Gear 38 is engaged with gear 41 having an outer circumferential end face provided with code plate 40 to which a plurality of magnetic poles are magnetized. Magnetic poles provided on code plate 40 move in accordance with rotation of the rotation axis to be detected. The number of the magnetic poles is counted by detection element 42 provided facing the outer circumferential end face so as to detect a rotation angle. Furthermore, as a device for detecting a rotation angle of a multiple rotation rotor such as an absolute encoder, a measurement method for detecting a rotation angle of an axis to be detected from rotation angles of a plurality of rotors having phase difference is known.

Prior art information relating to the invention of this application includes Japanese Patent Unexamined Publications No. H11-194007 and No. S63-118614.

In the thus configured rotation angle detection device, the rotation angle of the axis is detected by counting the number of a plurality of moved magnetic poles disposed on the outer circumferential end face of the code plate. Therefore, in order to improve the resolution of the detection angle, the dimension of the magnetized magnetic pole should be made to be fine. Furthermore, since rotation of the code plate and rotation of the axis are carried out via a gear, it is somewhat difficult to enhance the detection accuracy, by backlash and the like. Furthermore, since this rotation angle detection device can be employed only for detection of the relative rotation angle, it is not suitable for detecting an absolute rotation angle.

Furthermore, in the above-mentioned rotation angle detection device, due to arrangement accuracy and center deflections of gears, detection error in the rotation angle detection unit, or the like, the detection accuracy of the rotation angle of an axis to be detected may be deteriorated.

SUMMARY OF THE INVENTION

The present invention addresses the problems discussed above and provides a rotation angle detection device capable of detecting an absolute rotation angle of multiple rotation with a high accuracy and a high resolution by using a target connected to a rotation angle and having an outer circumferential surface to which magnetic poles of alternate polarities are magnetized.

Furthermore, the preset invention provides a rotation angle correction method of a rotation angle detection device for correcting a mechanical error of a gear and an electrical error of a rotation angle detection unit with a high accuracy.

The rotation angle detection device of the present invention has a first rotor holding a target connected to an input axis and having an outer circumferential surface to which magnetic poles of alternate polarities are magnetized at an identical interval, and a having a multi-rotatable gear. Furthermore, the rotation angle detection device has a first detector for detecting a rotation angle of the first rotor; a second rotor coupled to the gear of the first rotor, rotated at a lower speed than the first rotor, and having a magnet on the center portion; and a second detector for detecting a rotation angle of the second rotor. The first detection unit detects fine rotation angle, and the second detection unit detects rough absolute rotation angle. From these absolute rotation angles, multiple rotation angle of the first rotor is detected. With such a configuration, it is possible to detect an absolute rotation angle with a high accuracy and a high resolution by using a simple structure and a simple circuit configuration.

Furthermore, in the rotation angle detection device of the present invention, the first and second detectors include magnetic detection elements disposed in positions facing the target and the magnet. Since it is possible to detect an absolute rotation angle of the first and second rotors by a non-contact method, durability and reliability of the rotation angle detection device can be improved.

Furthermore, the rotation angle detection device of the present invention includes a nonvolatile memory (hereinafter, referred to as EEPROM) for storing sensitivities of a sine wave signal and a cosine wave signal output from the first and second detectors. After the first and second rotors are incorporated, the sine wave signal and the cosine wave signal are corrected with the respective sensitivities every time an electric power is turned on. The angle detection error caused by variation in sensitivities of the detection element and detection element amplifier is not generated, and thus, the rotation angle of the rotor can be exactly detected.

Furthermore, the rotation angle detection device of the present invention includes a sensitivity detection unit for detecting whether the sensitivity is within a specified value when the sensitivities of the respective magnetic detection elements are stored. When a signal whose sensitivity is out of the specified range is input due to variation in the sensitivity of the magnetic detection elements, such an unnecessary signal can be eliminated.

Furthermore, the rotation angle detection device of the present invention includes a signal amplitude detection unit for detecting whether a center of an amplitude of an output signal is within a specified value when the sensitivities of the respective magnetic detection elements are stored. Thus, even when an unnecessary signal having a center of the amplitude out of the specified range is input due to variation in characteristics of the magnetic detection elements, such unnecessary signals can be eliminated.

Furthermore, the rotation angle detection device of the present invention includes a signal detection unit for detecting a sine wave signal and a cosine wave signal at a plurality of times when the sensitivities of the respective magnetic detection elements are stored. Thus, even if the sine wave signal and the cosine wave signal are affected by noise and the like, detection error can be suppressed.

Furthermore, the rotation angle detection device of the present invention includes a position determination unit for determining a certain position of each magnetic detection element. When values of the sine wave signal and the cosine wave signal at the position are stored in, for example, an EEPROM, it is possible to detect an absolute rotation angle from a certain position in a certain rotation range.

The rotation angle detection device of the present invention has an advantage that by employing the above-mentioned configuration, a multiple rotation absolute rotation angle can be detected with a high accuracy and a high resolution.

Furthermore, another rotation angle detection device of the present invention includes:

(a) a multi-rotatable first rotor holding a first target connected to an input axis and having an outer circumferential surface to which magnetic poles of alternate polarities are magnetized at an identical interval;

(b) a first detection unit for detecting a rotation angle of the first rotor, which is disposed facing the magnetic pole of the first target;

(c) a second rotor coupled to the input axis and having a gear;

(d) a third rotor coupled to the gear of the second rotor and having a gear provided with a second target in a center portion;

(e) a second detection unit for detecting a rotation angle of the third rotor, which is disposed facing the second target;

(f) a fourth rotor coupled to the gear of the third rotor and having a gear provided with a third target in a center portion; and (g) a third detection unit for detecting a rotation angle of the fourth rotor, which is disposed facing the third target.

A multiple rotation angle of the first rotor can be detected with a high resolution and a high accuracy by combining a rotation angle of the first rotor detected by the first detection unit and a multiple rotation angle of the second rotor calculated from the rotation angles of the third and fourth rotors detected by the second and third detection units.

Furthermore, the rotation angle detection device of the present invention includes a pair of magnetic sensors including a multi-rotatable first target having an outer circumferential surface to which magnetic poles of alternate polarities are magnetized at an identical interval, and a first detection unit disposed facing the magnetic poles of the first target. When the configuration including the first target and the first detection unit is provided on the input axis, it is possible to detect a rotation angle of the first rotor with a high resolution and a high accuracy. Furthermore, by combining with the multiple rotation angle calculated from the difference between the third and fourth rotor having gears with different numbers of teeth, the multiple rotation angle can be detected with a high resolution and a high accuracy. Furthermore, by employing a magnetic detection element for the detection unit, it is possible to detect the rotation angle of the target by non-contacting method. Therefore, the durability and reliability of the rotation angle detection device can be improved. Furthermore, by comparing a rotation angle of the target to which magnetic poles are magnetized and a rotation angle of the gear with each other, abnormality in the rotation angle detecting device can be detected relatively easily.

Furthermore, another aspect of the present invention relates to a rotation angle correction method of a rotation angle detection device including a first rotation angle detection unit disposed in a position facing a target connected to an axis to be detected; a mechanism for reducing a rotation speed of the axis to be detected; and a second rotation angle detection unit for detecting a rotation angle whose rotation speed is reduced. Furthermore, in the rotation angle detection device for calculating a rotation angle of an axis to be detected by output signals from the first rotation angle detection unit and second rotation angle detection unit, by using a motor for rotating the axis to be detected, a motor controller for controlling a rotation angle of the motor, and an encoder for detecting the rotation angle of the motor, a difference between a rotation angle of the axis to be detected actually rotated by the motor and a calculated rotation angle of the axis to be detected obtained by the first and the second rotation angle detection units is stored as a corrected angle in an EEPROM, and the calculated rotation angle of the axis to be detected is corrected with this corrected angle.

Furthermore, in the rotation angle correction method of the present invention, the corrected angle is stored in the EEPROM every predetermined rotation angle in the entire detection range and the calculated rotation angle of the axis to be detected is corrected. In addition, between the predetermined rotation angles, correction is carried out by using a corrected angle estimated from an approximate line obtained from the corrected angles stored before and after the predetermined rotation angle.

Furthermore, in the rotation angle correction method of the present invention, a target is provided as a multipole ring magnet to which magnetic poles of reverse polarities are magnetized at an identical interval in a circumferential direction of the axis to be detected. In a rotation range corresponding to each magnetic pole width, an average value of each magnetic pole error is stored as a corrected angle common to each magnetic pole in the EEPROM. Thus, the calculated rotation angle of the axis to be detected is corrected with the corrected angle.

Furthermore, in the rotation angle correction method of the present invention, the target is provided as a gear having convex portions disposed at an identical interval in a circumferential direction of the axis to be detected. In the rotation range corresponding to each tooth width, an average value of errors of teeth is stored as a corrected angle common to the teeth in the EEPROM. Thus, the calculated rotation angle of the axis to be detected is corrected with the corrected angle.

Furthermore, in the rotation angle correction method of the present invention, the target has concave portions and non-concave portions disposed at a predetermined interval in a circumferential direction of the axis to be detected. In the rotation range corresponding to each concave portion width, an average value of errors of each concave portion is stored as a corrected angle common to each concave portion in the EEPROM. Thus, the calculated rotation angle of the axis to be detected is corrected with the corrected angle.

Furthermore, in the rotation angle correction method of the present invention, in the rotation range corresponding to the target interval, a corrected angle common to each target is stored in the EEPROM every predetermined rotation angle. The calculated rotation angle of the axis to be detected is corrected, and between the predetermined rotation angles, correction is carried out based on a corrected angle estimated from an approximate line property obtained from the corrected angles stored before and after the predetermined rotation angle.

Furthermore, in summary, in the rotation angle correction method of the present invention, correction data with less capacity are stored in the EEPROM and the calculated rotation angle of the axis to be detected is corrected by using the corrected data. Such a correction method of the rotation angle can significantly improve the detection accuracy of the calculated rotation angle of the axis to be detected including a mechanical error due to the dimension variation of the constituting components, a magnetic error due to the characteristic variation of a magnet, and an electrical characteristic error of a rotation angle detection unit or a detection circuit unit.

Furthermore, the correction method of the rotation angle of the present invention can correct the reduction of the rotation angle detection accuracy caused by a mechanical error, a magnetic error, an electrical characteristic error, and the like, of a multipole ring magnet or a rotation angle detection unit by using the corrected angle stored in an EEPROM with less capacity. Thus, it is possible to provide a correction method of the rotation angle detection device capable of improving the detection accuracy of rotation angle of the axis to be detected.

BRIEF DESCRIPTION OF THE DRAWINGS

FIG. 13A is a graph showing a rotation angle of a third rotor used for detecting a rotation angle of a first rotor in accordance with the second exemplary embodiment of the present invention.

FIG. 13B is a graph showing a rotation angle of a fourth rotor used for detecting a rotation angle of the first rotor in accordance with the second exemplary embodiment of the present invention.

FIG. 13C is a graph showing a difference in the rotation angle between the first rotor and the fourth rotor used for detecting a rotation angle of the first rotor in accordance with the second exemplary embodiment of the present invention.

FIG. 13D is a graph showing a rotation angle of a first target calculated by the first detection unit in accordance with the second exemplary embodiment of the present invention.

Figure 1:
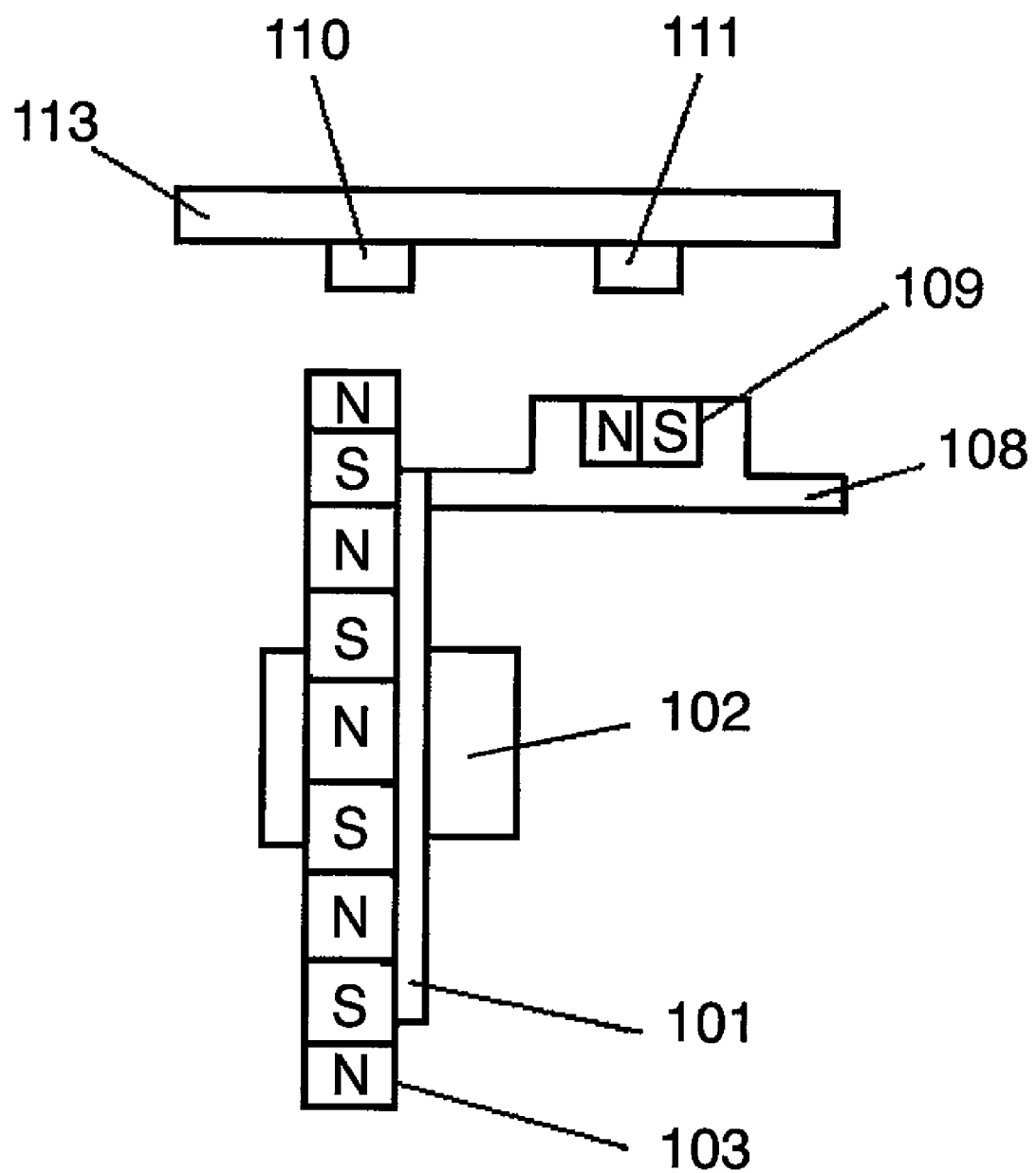
FIG. 1 is a diagram showing a basic configuration of a rotation angle detection device in accordance with a first exemplary embodiment of the present invention.

REFERENCE MARKS IN THE DRAWINGS 101, 203 first rotor
102 input axis
103 target
108, 210 second rotor
109 magnet
110 first magnetic detection element
111 second magnetic detection element
114 microcomputer (CPU)
115 nonvolatile memory (EEPROM)
116 amplifier
119 rotation angle operation output signal from first magnetic detection element
120 rotation angle operation output signal from second magnetic detection element
121 calculated absolute rotation angle of rotation angle detection device
122 ideal absolute angle
123 sine wave signal
124 cosine wave signal
126 sine wave signal level
127 cosine wave signal level
128 specified range
129 switch
131 certain position determination signal line
132 output signal line
204 input axis
205 first target
210 second rotor
211 third rotor
212 second target
213 first detection unit
214 fourth rotor
215 third target
216 second detection unit
217 third detection unit
219, 220 substrate
301 axis to be detected
302 multipole ring magnet
303 first rotation angle detection unit
304 worm gear
305 wheel gear
306 magnet
307 second rotation angle detection unit
308 rotation angle detection device
309 motor
310 encoder
311 nonvolatile memory (EEPROM)
312 CPU
313 serial communication line
314 motor controller
315 Sin signal
316 Cos signal
327, 328 target
$\theta e$, $\theta e1$ rotation electrical angle
$\theta m$, $\theta m1$, $\theta m2$, $\theta m3$, $\theta m4$ rotation mechanical angle
$\Delta\theta m1$, $\Delta\theta m2$ rotation mechanical angle error
$\Delta\theta m1Av$ average value of rotation mechanical angle error

DETAILED DESCRIPTION OF THE PREFERRED EMBODIMENTS

First Exemplary Embodiment

Hereinafter, the first exemplary embodiment of the present invention is described with reference to FIGS. 1 to 7.

Figure 3:
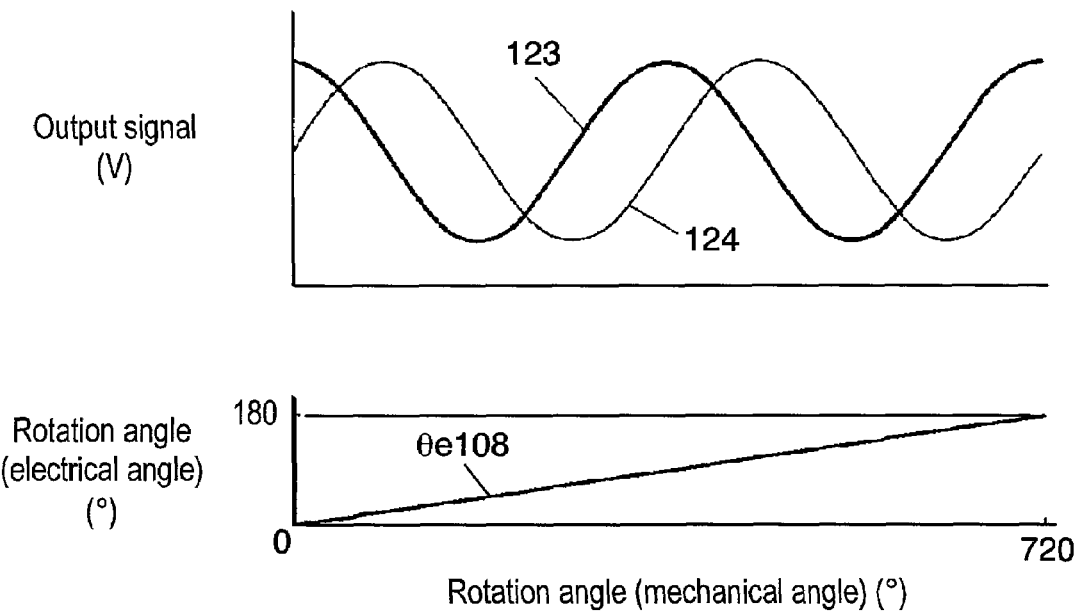
FIG. 3 is a graph showing a rotation angle detection signal of a second magnetic detection element in accordance with the first exemplary embodiment of the present invention.
Figure 4:
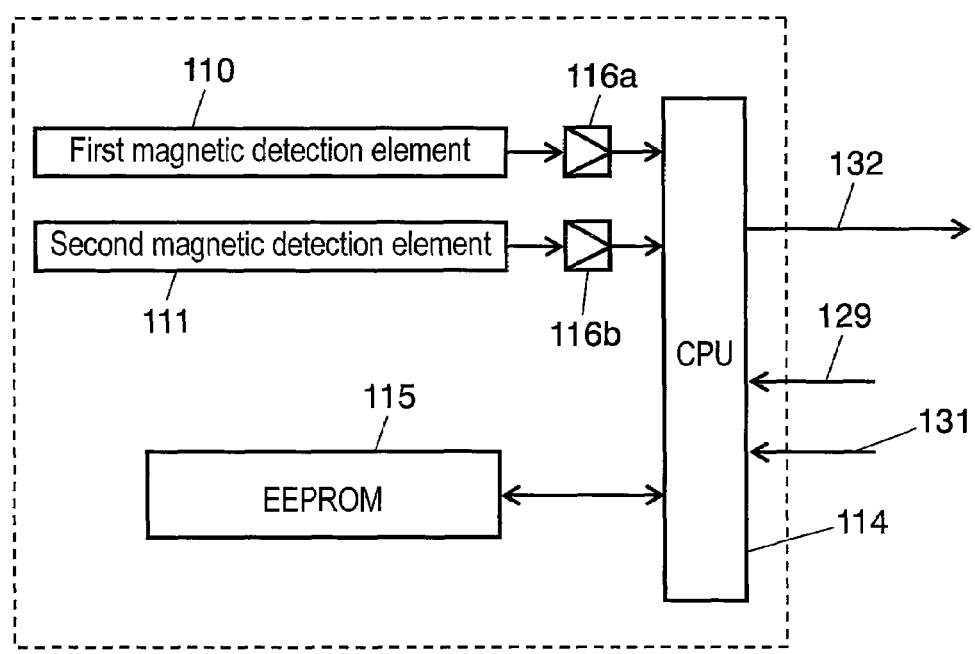
FIG. 4 is a circuit block diagram showing a rotation angle detection device in accordance with the first exemplary embodiment of the present invention.
Figure 5:
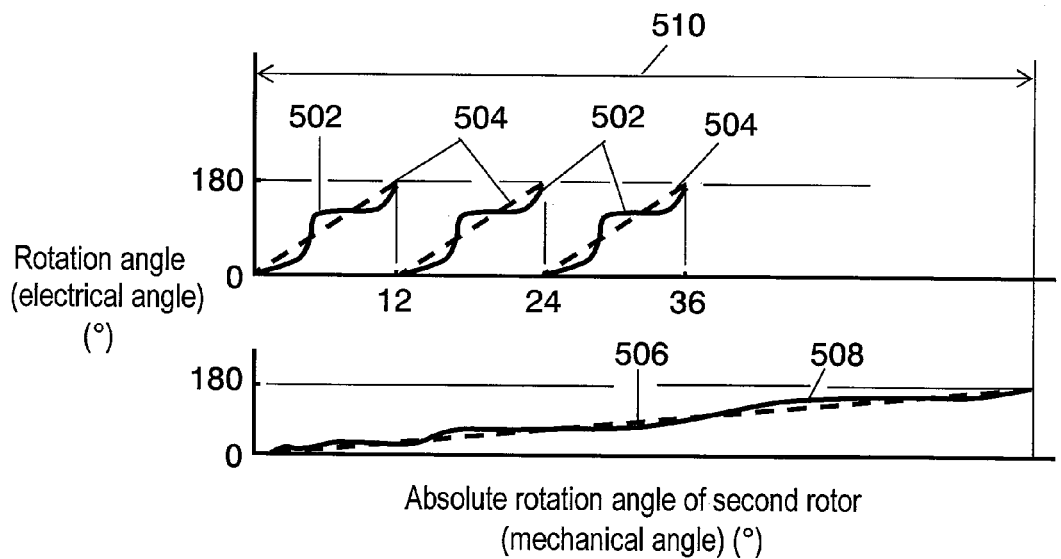
FIG. 5 is a graph showing an ideal value and an actual value of an absolute rotation angle of the first rotor in accordance with the first exemplary embodiment of the present invention.
Figure 6:
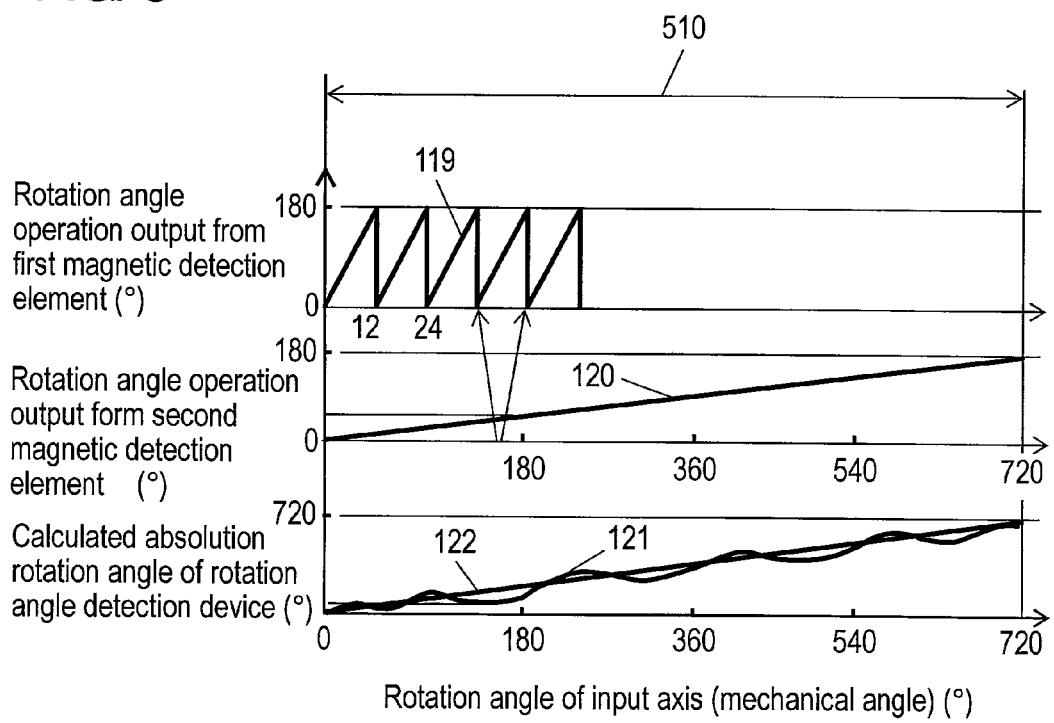
FIG. 6 is a characteristic graph showing a rotation angle operation output signal in each element in a CPU and an absolute rotation angle of the rotation angle detection device in accordance with the first exemplary embodiment of the present invention.
Figure 7:
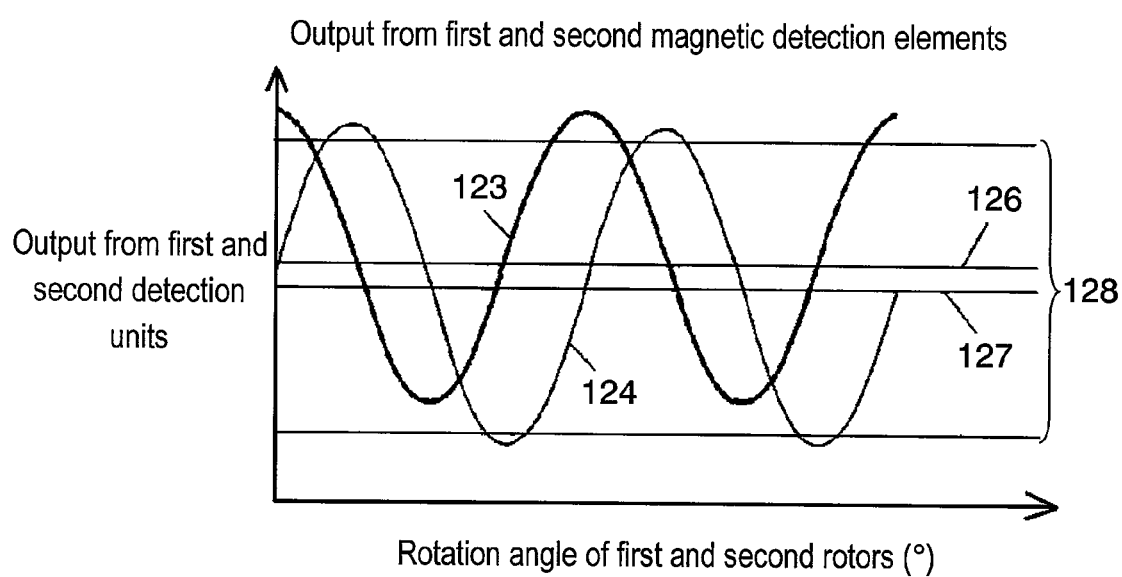
FIG. 7 is a graph showing output signals output from first and second magnetic detection elements in accordance with the first exemplary embodiment of the present invention.

FIG. 1 is a diagram showing a basic configuration of an absolute rotation angle detection device in accordance with the first exemplary embodiment of the present invention; FIG. 2 is a view showing a rotation angle detection signal of a first magnetic detection element; FIG. 3 is a graph showing a rotation angle detection signal of a second magnetic detection element; and FIG. 4 is a circuit block diagram showing an absolute rotation angle detection device. FIG. 5 is a graph showing an ideal value and an actual value of an absolute rotation angle of the first and second rotors; FIG. 6 is a graph showing a rotation angle operation output signal and an absolute rotation angle in a CPU; and FIG. 7 is a graph showing output signals output from first and second magnetic detection elements.

In FIG. 1, first rotor 101 is a rotor having a multi-rotatable gear fitted into and connected to input axis 102. First rotor 101 holds targets 103 and has an outer circumferential surface to which magnetic poles of alternate polarities are magnetized at an identical interval. Second rotor 108 is provided in a way in which it is engaged with the gear of first rotor 101 and has magnet 109 disposed in the center portion thereof. First magnetic detection element (detection unit) 110 is disposed in a position facing target 103, and second magnetic detection element (detection unit) 111 is disposed in a position facing magnet 109, so that the magnetic field direction is detected. First and second magnetic detection elements 110 and 111 are disposed on substrate 113. The gear of first rotor 101 and a gear of second rotor 108 are connected to each other. When first rotor 101 rotates, second rotor 108 is rotated in accordance with the speed in response to the ratio of the number of teeth of respective gears.

First and second magnetic detection elements 110 and 111 are described in a case where a magnetoresistive element (hereinafter, referred to as "MR element") is used. Magnetic detection elements 110 and 111 output a sine wave signal and a cosine wave signal in a form of an analog signal in response to the change of the magnetic field. When the change of the magnetic field of target 103 is detected by first magnetic detection element 110, one cycle of sine wave signal and cosine wave signal are output to one pole. Therefore, it is possible to obtain sine wave signals and cosine wave signals by the number of magnetic poles each rotation. These output signals are amplified to a specified amplitude by an amplifier and are subjected to operation processing via an A/D converter (not shown) built in microcomputer (hereinafter, referred to as CPU) 114 so as to calculate the rotation of target 103, that is, an absolute rotation angle of first rotor 101.

Figure 2A:
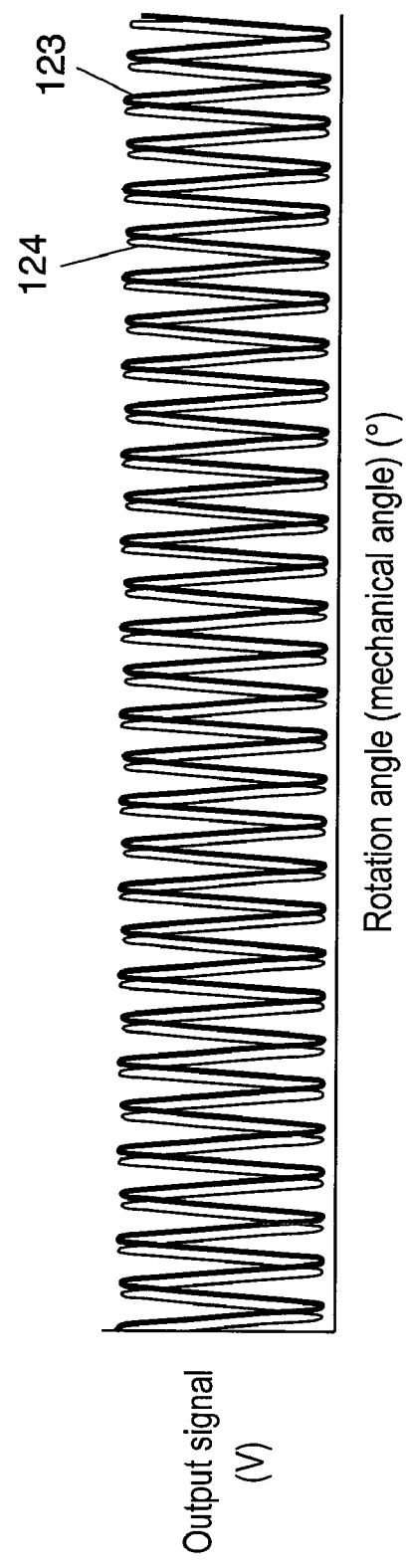
FIG. 2A is a view showing a rotation angle detection signal of a first magnetic detection element in accordance with the first exemplary embodiment of the present invention.

FIG. 2A shows a rotation angle detection signal output from first magnetic detection element 110. The abscissa indicates a rotation angle (mechanical angle) of input axis 102, and the ordinate indicates sine wave signal 123 and cosine wave signal 124 output from first magnetic detection element 110, respectively.

Figure 2B:
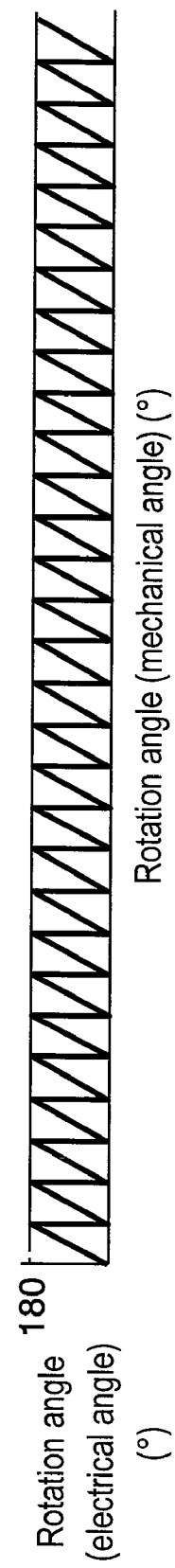
FIG. 2B is a view showing a rotation angle (electrical angle) of a first rotor in accordance with the first exemplary embodiment of the present invention.

FIG. 2B shows a rotation angle (electrical angle) of first rotor 101 with respect to input axis 102.

Second magnetic detection element 111 detects the change of the magnetic field of magnet 109 disposed in the center portion of second rotor 108. Output signals of two cycles of sine wave signal and cosine wave signal are output with respect to one rotation of magnet 109. These output signals are subjected to operation processing in CPU 114 so as to calculate an absolute rotation angle of second rotor 108.

FIG. 3 shows a rotation angle detection signal of second magnetic detection element 111. The abscissa indicates a rotation angle (mechanical angle) of input axis 102, and the ordinate indicates sine wave signal 123 and cosine wave signal 124 output from second magnetic detection element 111, respectively. Furthermore, the ordinate indicates rotation angle (electrical angle) θe108 in the operation process in the CPU of second rotor 108.

FIG. 4 is a circuit block diagram showing a rotation angle detection device. In FIG. 4, output signals output from first and second magnetic detection elements 110 and 111 are input into CPU 114 via amplifiers 116a and 116b, respectively, and are subjected to operation processing. Thus, an absolute rotation angle is output. Furthermore, to CPU 114, EEPROM 115 is coupled.

In FIG. 5, the abscissa indicates an absolute rotation angle of input axis 102 and the ordinate indicates a fine absolute rotation angle obtained from first rotor 101. Characteristic 502 (solid line) shows an actual value of the absolute rotation angle obtained from first rotor 101, and characteristic 504 (broken line) shows an ideal value of the absolute rotation angle of first rotor 101, respectively.

In the lower segment of FIG. 5, the ordinate indicates rough absolute rotation angles (from 0° to 180°) obtained from second rotor 108. Characteristic 506 (broken line) shows an ideal value of an absolute rotation angle of second rotor 108, and characteristic 508 (solid line) shows an actual value of the absolute rotation angle obtained from second rotor 108, respectively. Furthermore, FIG. 5 shows absolute rotation angle detection range 510.

Next, a rotation angle detection method of a rotor is described. In FIG. 1, when first rotor 101 rotates, second rotor 108 is rotated by a gear of second rotor 108 coupled to a gear of first rotor 101. When the number of teeth of the gear of first rotor 101 is denoted by "a" and that of second rotor 108 is denoted by "b", second rotor 108 rotates at a speed that is a/b times as that of first rotor 101. At this time, by appropriately selecting numbers of teeth of gear "a" and "b", second rotor 108 can be rotated at sufficiently lower speed than that of first rotor 101.

With first magnetic detection element 110 disposed in the position facing target 103 held by first rotor 101, the change of the magnetic field with respect to the rotation of first rotor 101 is detected so as to change the output signal. On the other hand, second magnetic detection element 111 disposed in a position facing second rotor 108 having magnet 109 in the center portion detects the change of the magnetic field penetrating second magnetic detection element 111 when second rotor 108 is rotated, so that output signal is changed.

Output signals from first magnetic detection element 110 and second magnetic detection element 111 are input via an A/D converter built in CPU 114. With the output signal from second magnetic detection element 111, an absolute angle detection is roughly carried out so as to detect that the angle at which second rotor 108 is disposed as compared with the initial position. Then, with the output signals from first magnetic detection element 110, an absolute angle of the rotation angle of first rotor 101 is finely carried out. With the output signal, the absolute rotation angle is calculated and output. In FIG. 6, rotation angle detection range 510 is shown.

FIG. 6 shows correlation characteristic between rotation angle operation output signals from first and second magnetic detection elements 110 and 111 and an absolute rotation angle of the rotation angle detection device in CPU 114. Rotation angle operation output signal 119 from first magnetic detection element 110, rotation angle operation output signal 120 from second magnetic detection element 111, calculated absolute rotation angle 121 and ideal absolute rotation angle 122 of the rotation angle detection device are shown, respectively.

Next, a method for suppressing variation in sensitivity of first and second magnetic detection elements 110 and 111 and amplifiers 116a and 116b and preventing the occurrence of an error in the detection of a rotation angle during operation is described with reference to FIGS. 1, 4 and 7.

In FIG. 1, when first rotor 101 rotates, target 103 also rotates. With the rotation of target 103, the magnetic field changes. This change of the magnetic field is detected by first magnetic detection element 110. First magnetic detection element 110 outputs sine wave signal 123 and cosine wave signal 124 with respect to this change of the magnetic field. FIG. 7 shows these output signals. These output signals are input into CPU 114 via amplifiers, and inverse arc tangent signals are calculated from sine wave signal 123 and cosine wave signal 124. However, as shown in FIG. 7, when sine wave signal level 126 and cosine wave signal level 127 are slightly different because of variation in sensitivity of the magnetic detection element or the amplifier, the accuracy of the calculated inverse arc tangent signal is lowered.

Then, when switch 129 shown in FIG. 4 is turned on so as to set to a sensitivity memory mode, first rotor 101 is rotated so that second rotor 108 is rotated by 180° or more. Then, the maximum and minimum levels of sine wave signal 123 and cosine wave signal 124 are calculated, and each signal level (sensitivity) is stored in EEPROM 115. Next, when switch 129 is turned off and a rudder angle value is calculated, the maximum and minimum levels of sine wave signal 123 and cosine wave signal 124 are operated to coincide with each other and an inverse arc tangent signal is calculated. Thus, the rudder angle is obtained.

Furthermore, in the case where the maximum value and minimum value of the output signals of first and second magnetic detection elements 110 and 111 do not fall within specified range 128, the output signals do not change or necessary resolution cannot be obtained due to the temperature characteristic and the like. Therefore, by providing some means (not shown) for confirming that the maximum value and the minimum value of each output signal shown in FIG. 7 fall in specified range 128, an output error can be prevented. When a signal amplitude detection unit (not shown) for detecting a center of the amplitude of the output signals from first and second magnetic detection elements 110 and 111 is provided, an output error due to characteristic variation can be prevented. Furthermore, at this time, for example, by executing input at a plurality of times so as to take an average, or by taking an average excluding the maximum and minimum values, an output error can be prevented with a higher accuracy.

Furthermore, by storing output signals from first magnetic detection element 110 and second magnetic detection element 111 at a certain position, it is possible to detect an absolute rotation angle from a certain position. Furthermore, at this time, when a signal showing a certain position is sent by an electrical signal as shown by certain position determination signal line 131 in FIG. 4, it is possible to confirm the certain position without carrying out a mechanical operation. Furthermore, by reading an electrical signal at a plurality of times so as to be checked or by sending a signal by a serial signal, even if a wrong signal is input due to a noise, such unnecessary signals can be eliminated. Note here that the same effect can be obtained even when certain position determination signal line 131 uses the same terminal as that of output signal line 132 by switching input and output.

Second Exemplary Embodiment

Figure 8A:
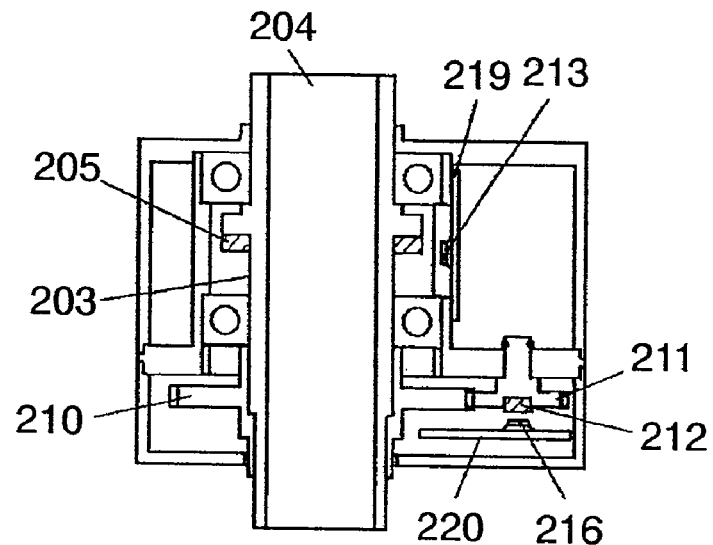
FIG. 8A is a side sectional view showing a basic configuration of a rotation angle detection device in accordance with a second exemplary embodiment of the present invention.
Figure 8B:
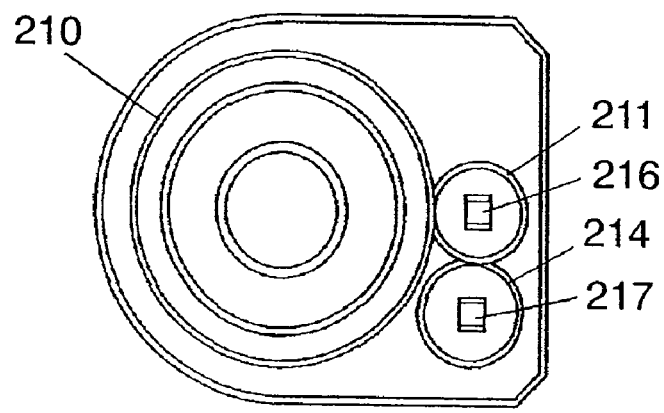
FIG. 8B is a plan view showing a basic configuration of a rotation angle detection device in accordance with the second exemplary embodiment of the present invention.
Figure 8C:
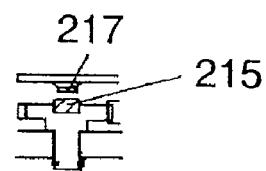
FIG. 8C is a partial sectional view showing a basic configuration of a rotation angle detection device in accordance with the second exemplary embodiment of the present invention.
Figure 9:
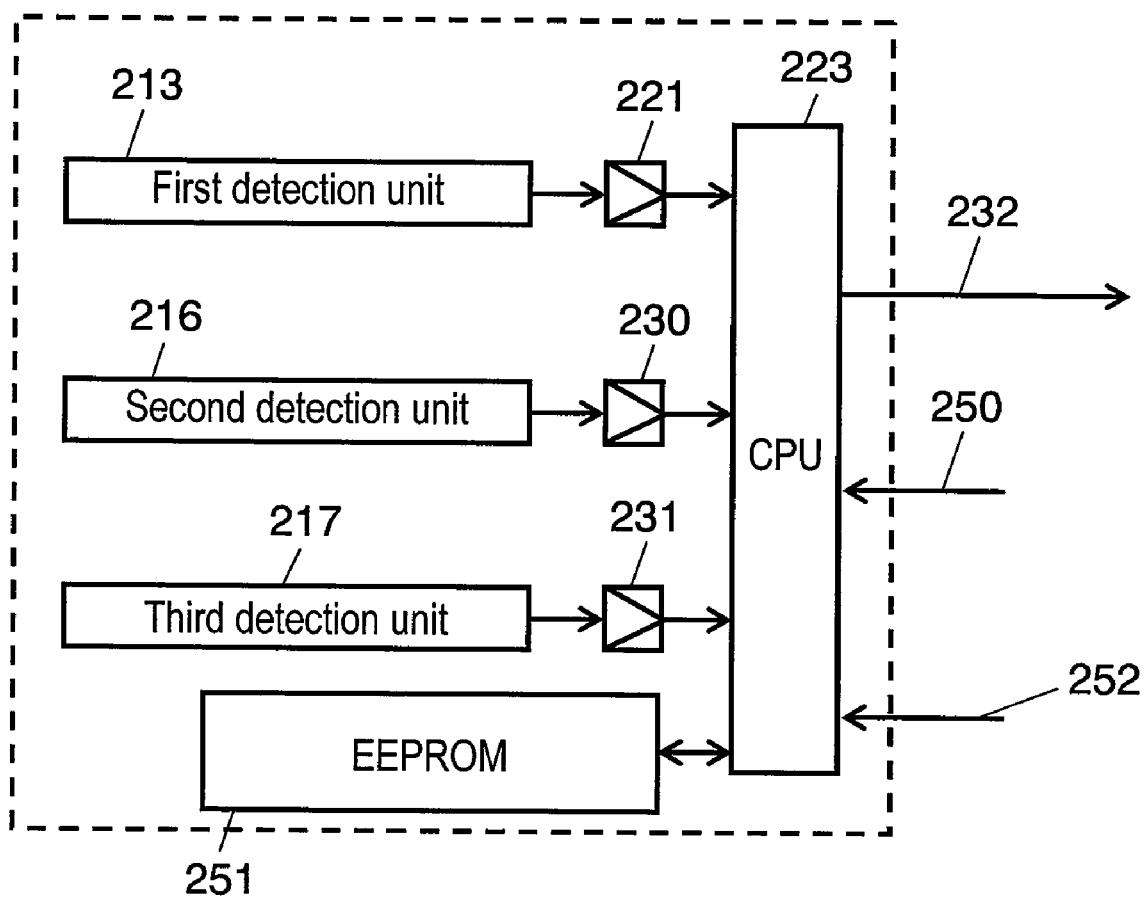
FIG. 9 is a circuit block diagram showing a rotation angle detection device in accordance with the second exemplary embodiment of the present invention.
Figure 10A:
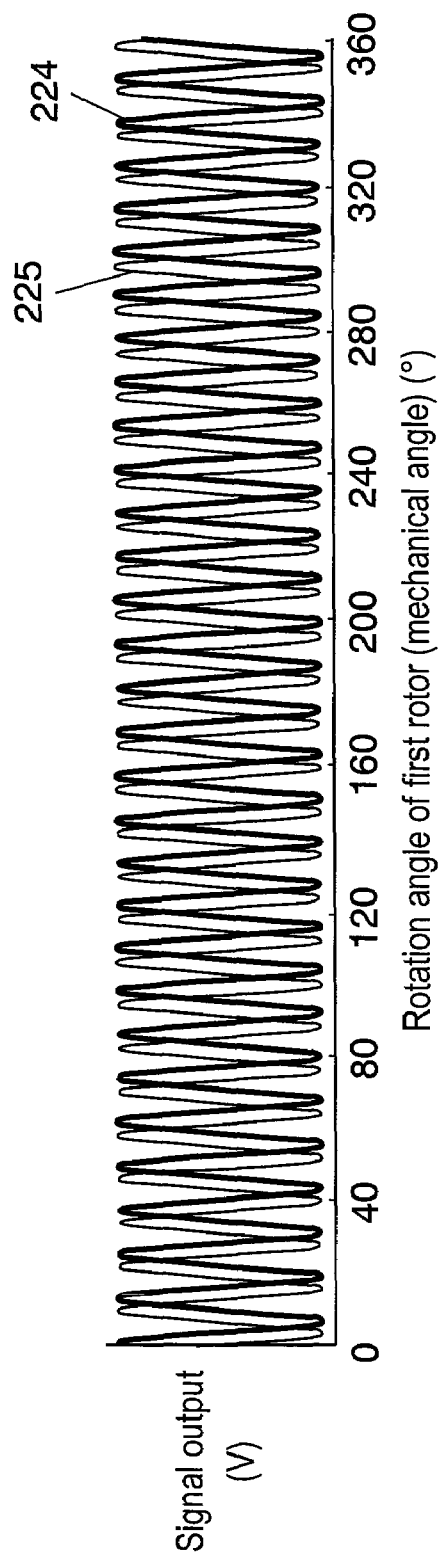
FIG. 10A is a view showing an output signal from a first detection unit in accordance with the second exemplary embodiment of the present invention.
Figure 10B:
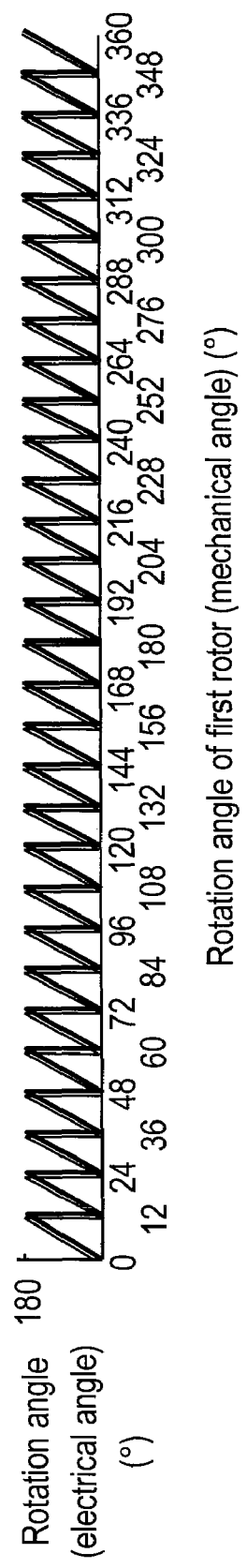
FIG. 10B is a view showing a relation between a mechanical angle and an electrical angle of the output signal from the first detection unit in accordance with the second exemplary embodiment of the present invention.
Figure 11A:
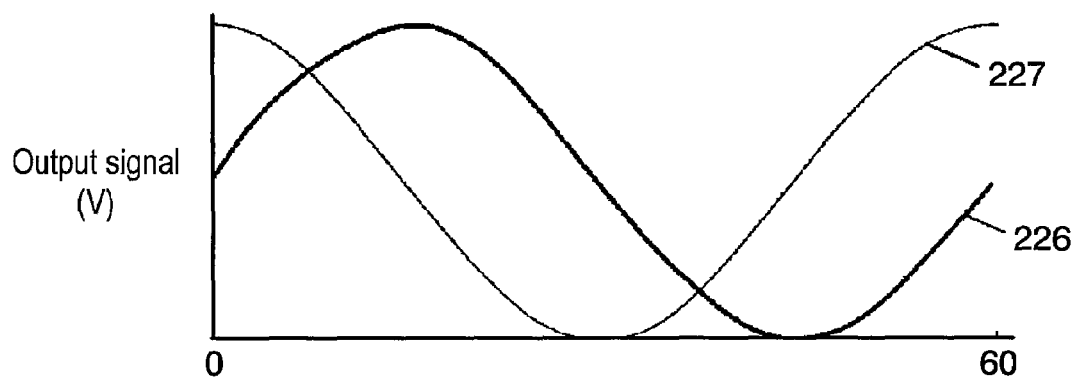
FIG. 11A is a graph showing an output signal from a third detection unit in accordance with the second exemplary embodiment of the present invention.
Figure 11B:
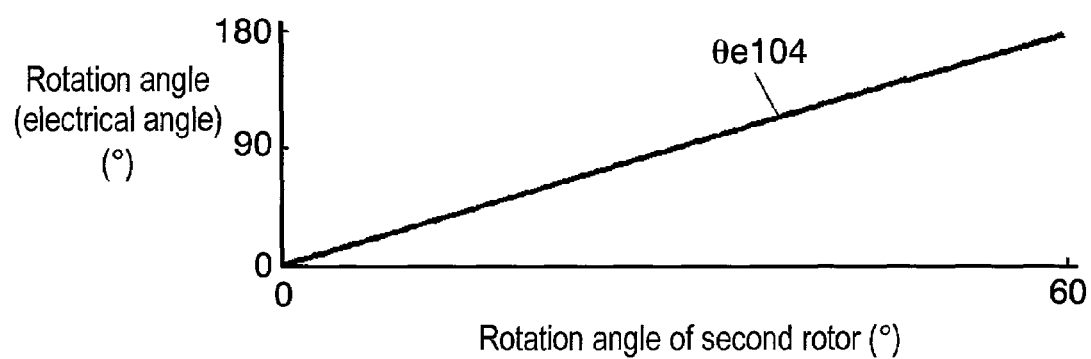
FIG. 11B is a graph showing a rotation angle (electrical angle) of the output signal from the third detection unit in accordance with the second exemplary embodiment of the present invention.
Figure 12A:
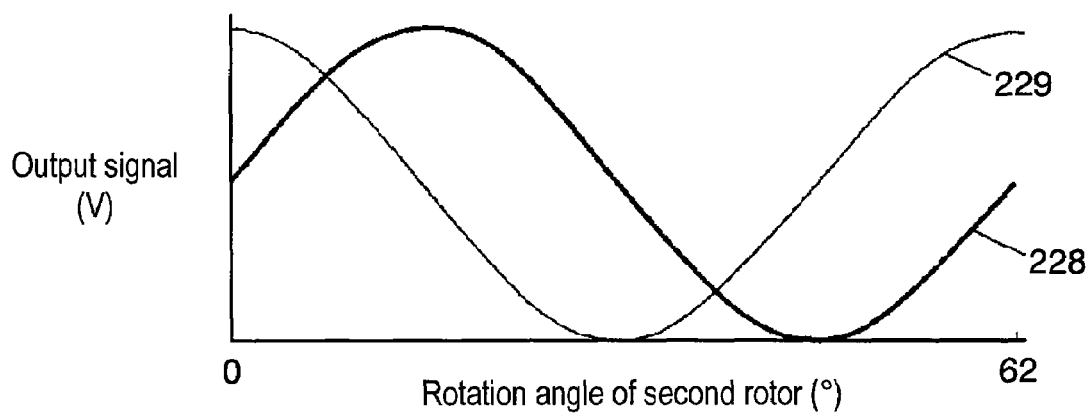
FIG. 12A is a graph showing an output signal from a fourth detection unit in accordance with the second exemplary embodiment of the present invention.
Figure 12B:
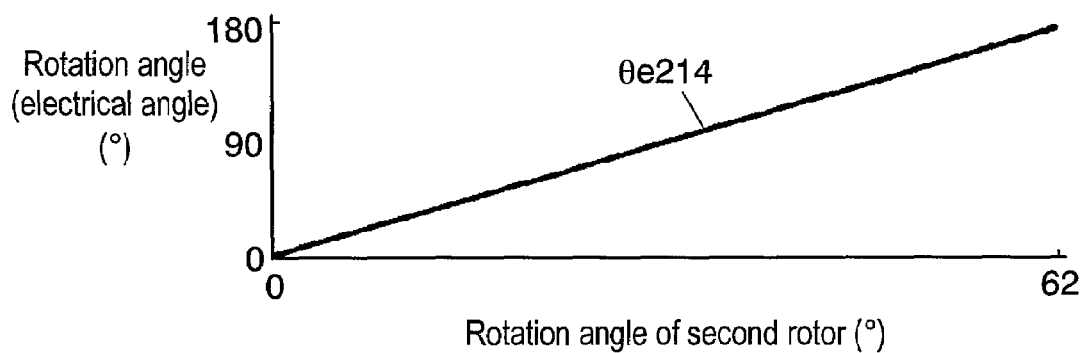
FIG. 12B is a graph showing a rotation angle (electrical angle) of the output signal from the fourth detection unit in accordance with the second exemplary embodiment of the present invention.
Figure 14:
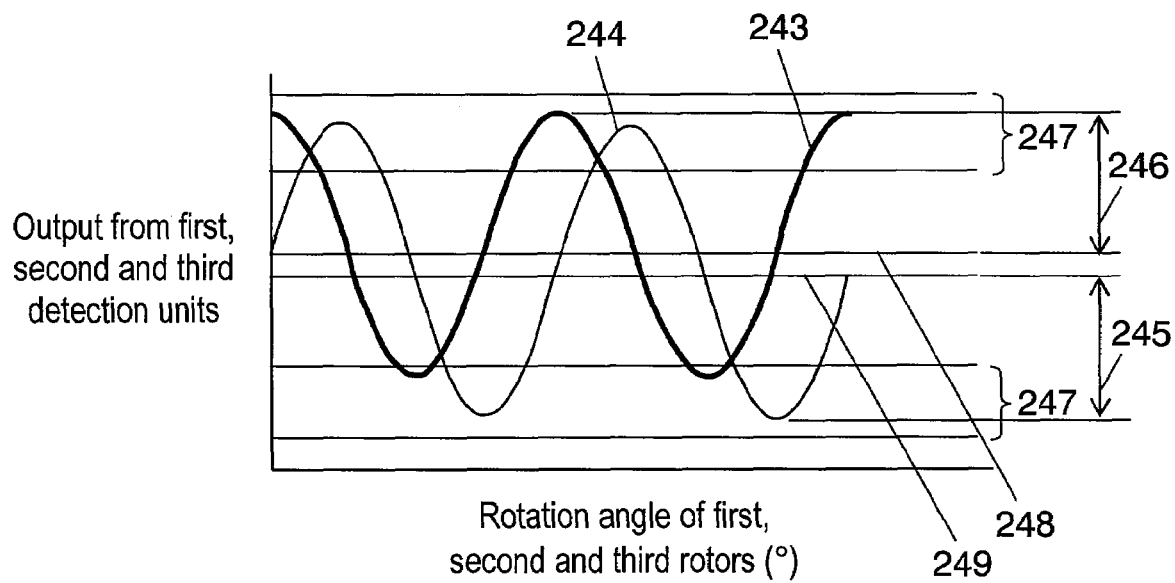
FIG. 14 is a graph showing output signals from the first to third detection units in accordance with the second exemplary embodiment of the present invention.

A second exemplary embodiment is described with reference to FIG. 8A to FIG. 14. FIGS. 8A, 8B and 8C show a basic configuration of a rotation angle detection device in accordance with the second exemplary embodiment; FIG. 9 is a circuit block diagram showing a rotation angle detection device; FIGS. 10A and 10B show an output signal from a first detection unit; FIGS. 11A and 11B show an output signal from a third detection unit; FIGS. 12A and 12B show an output signal from a fourth detection unit; FIG. 13 shows rotation angles of third and fourth rotors used for detecting a rotation angle of the first and second rotors; and FIG. 14 is a view to illustrate a method for preventing the occurrence of a detection error of a rotation angle.

In FIG. 8A to 8B, multi-rotatable first rotor 203 is fitted into input axis 204. First target 205 held by first rotor 203 has an outer circumferential surface to which magnetic poles of alternate polarities are magnetized at an identical interval. Second rotor 210 has a multi-rotatable gear fitted into first rotor 203. Third rotor 211 is engaged with the gear of second rotor 210, and second target (single pole magnet) 212 is disposed in the center portion of third rotor 211. Second detection unit (magnetic detection element) 216 is disposed in a position facing second target 212 so as to detect the magnetic field direction. Fourth rotor 214 is engaged with a gear of third rotor 211 and third target (single pole magnet) 215 is disposed in the center portion of fourth rotor 214. Third detection unit (magnetic detection element) 217 is disposed in a position facing third target 215 so as to detect the magnetic field direction. First detection unit (magnetic detection element) 213 is disposed in a position facing first target 205 so as to detect the magnetic field direction. Substrate 219 is provided with first detection unit 213 (magnetic detection element), and substrate 220 is provided with second and third detection units 216 and 217 (magnetic detection elements), respectively.

The number of magnetized magnetic poles of first target 205 is decided to be 30 poles (north pole: 15, and south pole: 15) with a margin. In this case, the degree per pole is 12°.

Next, a case where an MR element is used for first, second and third detection units 213, 216 and 217 is described. The MR element used for each detection unit detects the magnetic field direction respectively, and outputs a sine wave signal and a cosine wave signal in a form of an analog signal.

When the change of the magnetic field direction of first target 205 is detected by first detection unit 213, one cycle of sine wave signal and cosine wave signal are output with respect to a pole with one magnetic pole. When first target 205 is rotated once, it is possible to obtain sine wave signals and cosine wave signals for the number of magnetized magnetic poles.

FIG. 9 is a circuit block diagram showing a rotation angle detection device in accordance with the second exemplary embodiment of the present invention. As shown in FIG. 9, an output signal from first detection unit 213 is amplified to a specified amplitude by amplifier 221, input into an A/D converter (not shown) built in CPU 223, and subjected to operation processing. Then, a rotation angle of first target 205, that is, first rotor 203 is calculated. Furthermore, second and third detection units 216 and 217 are coupled to CPU 223 via amplifiers 230 and 231, respectively. On the other hand, a rotation angle calculated in CPU 223 is output via output signal line 232. In FIG. 9, EEPROM 251 calculates and stores certain positions of first detection unit 213, second detection unit 216 and third detection unit 217, signal levels (sensitivities), maximum and minimum levels and amplitude center level of a sine wave signal and the cosine wave signal output therefrom.

FIG. 10A shows an output signal output from first detection unit 213. The abscissa indicates a rotation angle of first rotor 203 fitted into input axis 204. The ordinate indicates sine wave signal 224 and cosine wave signal 225 output from first detection unit 213.

FIG. 10B shows an electrical angle of an output signal output from first detection unit 213. The abscissa indicates a rotation angle of first rotor 203. The ordinate indicates a rotation angle (electrical angle) of first rotor 203 calculated in CPU 223 based on sine wave signal 224 and cosine wave signal 225, respectively.

On the other hand, a gear of third rotor 211 is connected to a gear of second rotor 210 and rotates at a speed ratio by the ratio between the number of teeth of third rotor 211 and that of second rotor 210.

Second detection unit 216 detects a magnetic field direction of second target (single pole magnet) 212 disposed in the center portion of third rotor 211, and outputs one cycle of sine wave signal and cosine wave signal with respect to 0.5 rotations of second target (single pole magnet) 212. This output signal is subjected to operation processing in CPU 223 so as to calculate a rotation angle of third rotor 211.

In FIG. 11A, the abscissa indicates a rotation angle of second rotor 210, and the ordinate indicates sine wave signal 226 and cosine wave signal 227 output from second detection unit 216, respectively. In FIG. 11B, similar to FIG. 11A, the abscissa indicates a rotation angle of second rotor 210, and the ordinate indicates electrical angle θe104 obtained by operating a rotation angle of third rotor 211 based on sine wave signal 226 and cosine wave signal 227 in CPU 223.

A gear of fourth rotor 214 is connected to second rotor 210 via a gear of third rotor 211. Fourth rotor 214 rotates at a speed ratio by the number of teeth of each gear when second rotor 210 is rotated.

Third detection unit 217 detects a magnetic field direction of third target (single pole magnet) 215 disposed in the center portion of fourth rotor 214, and outputs one cycle of sine wave signal and cosine wave signal with respect to 0.5 rotations of third target (single pole magnet) 215. This output signals are subjected to operation processing in CPU 223 so as to calculate a rotation angle of fourth rotor 214.

In FIG. 12A, the abscissa indicates a rotation angle of second rotor 210, and the ordinate indicates sine wave signal 228 and cosine wave signal 229 output from third detection unit 217, respectively. Similar to FIG. 12A, in FIG. 12B, the abscissa indicates a rotation angle of second rotor 210, and the ordinate indicates electrical angle θe214 calculated by operating a rotation angle of fourth rotor 214 based on sine wave signal 229 and cosine wave signal 229 in CPU 223.

In FIG. 13A, the abscissa indicates a rotation angle of second rotor 210 fitted into input axis 204, and the ordinate indicates rotation angle of third rotor 211 calculated from a signal obtained by second detection unit 216, respectively.

In FIG. 13B, the abscissa indicates a rotation angle of second rotor 210 fitted into input axis 204, and the ordinate indicates a rotation angle of fourth rotor 214 calculated from a signal obtained from third detection unit 217, respectively. Since the number of teeth of a gear mounted on third rotor 211 is different from the number of teeth of a gear mounted on fourth rotor 214, the rotation cycles with respect to the rotation angle of second rotor 210 are different.

In FIG. 13C, the abscissa indicates a rotation angle of second rotor 210 fitted into input axis 204, and the ordinate indicates a difference in the rotation angle between third rotor 211 and fourth rotor 214 calculated from a signal obtained from second detection unit 216 and a signal obtained from third detection unit 217.

In FIG. 13D, the abscissa indicates a rotation angle of first rotor 203 fitted into input axis 204, and the ordinate indicates a rotation angle of first target 205 calculated from a signal obtained from first detection unit 213, respectively.

Next, a method for detecting a multiple rotation angle of a rotor is described with reference to FIGS. 8A to 8C. When second rotor 210 fitted into first rotor 203 shown in FIG. 8A rotates, third rotor 211 is rotated by a gear of third rotor 211 coupled to a gear of second rotor 210. At the same time, fourth rotor 214 is rotated by a gear of fourth rotor 214 coupled to the gear of third rotor 211. When the numbers of teeth of the gears of second rotor 210, third rotor 211 and fourth rotor 214 are denoted by "a", "b", and "c", third rotor 211 rotates at a speed that is a/b times as that of second rotor 210, and fourth rotor 214 rotates at a speed that is a/c times as that of second rotor 210. At this time, by appropriately selecting numbers of teeth of gears, "a," "b" and "c", the multiple rotation angle of second rotor 210 can be obtained from the difference in the rotation angle between third rotor 211 and fourth rotor 214.

Second detection unit 216 disposed facing second target (single pole magnet) 212 disposed in the center portion of third rotor 211 detects a magnetic field direction penetrating second detection unit 216 so as to detect a rotation angle of third rotor 211.

On the other hand, third detection unit 217 disposed facing third target (single pole magnet) 215 disposed in the center portion of fourth rotor 214 detects a magnetic field direction penetrating third detection unit 217 so as to detect a rotation angle of fourth rotor 214. The output signals from second detection unit 216 and third detection unit 217 are input via an A/D converter (not shown) built in CPU 223. The multiple rotation angle of second rotor 210 is calculated from the difference of a rotation angle calculated from output signals from second detection unit 216 and third detection unit 217. By estimating the position of the magnetic pole of first target 205 from this multiple rotation angle, the multiple rotation angle of first target 205 is calculated with a high accuracy.

FIGS. 13A to 13D show rotation angles calculated in CPU 223 based on the output signals from the first, second and third detection units 213, 216 and 217. Rotation angle 235 of third rotor 211 is operated based on an output signal from second detection unit 216, and rotation angle 236 of fourth rotor 214 is operated based on the output signal of third detection unit 217, respectively. Rotation angle difference 237 shows a difference of rotation angle between third rotor 211 and fourth rotor and fourth rotor 214, which is calculated from the output signals from second detection unit 216 and third detection unit 217. Rotation angle difference 237 changes linearly from 0° to 180° in the rotation detection range of 0° to 1800° of second rotor 210. This means that the multiple rotation angle of second rotor 210 can be uniquely defined in the rotation detection range of 0° to 1800° with rotation angle difference 237.

On the other hand, rotation angle 233 of first target 205 (multipole ring magnet) calculated based on the signal from first detection unit 213 linearly changes from 0° to 180° in the electrical angle in the rotation angle between the magnetized poles (in this case, 12°). This means that the rotation angle of first rotor 203 holding first target 205 can be uniquely defined in the rotation angle between magnetized poles with rotation angle 233. Since second rotor 210 and first rotor 203 holding first target 205 are fitted to the same axis, the position of the magnetic pole of first target 205 is estimated from the multiple rotation angle of second rotor 210 so as to calculate the multiple rotation angle of first target 205 with a high accuracy.

Next, a method for detecting abnormality of the rotation angle detection device by comparing the rotation angle of first rotor 203 and the rotation angle of third rotor 211 is described with reference to FIGS. 9, 10A, 10B, 11A, 11B and 13.

In FIG. 9, when first rotor 203 rotates, first target 205 held by first rotor 203 rotates. If thirty poles are magnetized on the surface of first target 205, the output signal shown in FIG. 10A is obtained from first detection unit 213. Every time first rotor 203 rotates at 12°, sine wave signal 224 and cosine wave signal 225 change in one cycle. An electrical angle calculated from these signals changes by 180°. That is to say, the rotation angle of first rotor 203 can be obtained uniquely in the range of 12° of the rotation angle. When the ratio of the number of teeth of a gear of second rotor 210 and that of third rotor 211 is provisionally set to ⅓, as shown in FIG. 11A, every time second rotor 210 rotates in 60°, sine wave signal 226 and cosine wave signal 227 change in one cycle, and an electrical angle calculated from these signals changes by 180°.

In FIGS. 13A and 13D, the difference between rotation angle 233 of first target 205 calculated from first detection unit 213 and rotation angle 235 of third rotor 211 calculated from second detection unit 216 is a value that is not more than the specified value unless inconvenience occurs in the rotation angle detection device, when the gradient of rotation angle 233 and rotation angle 235 is corrected with a rotation angle ratio (12:60=1:5) of one cycle by using a certain rotation angle as an original angle. That is to say, abnormality is determined by calculating a difference between a value that is made to be five times of rotation angle 235 and rotation angle 233.

Next, a method for preventing a rotation detection error from occurring due to variation in sensitivity of first, second and third detection units (magnetic detection elements) 213, 216 and 217, amplifiers 221, 230 and 231, and the like, is described.

In FIG. 8A, when first rotor 203 rotates, first target 205 also rotates. With the rotation of first target 205, the magnetic field direction changes. This change of the magnetic field direction is detected by first detection unit 213. From first detection unit 213, with respect to this change of the magnetic field direction, sine wave signal 224 and cosine wave signal 225 are output.

In FIG. 10A, the abscissa indicates a rotation angle of first rotor 203 and the ordinate indicates sine wave signal 224 and cosine wave signal 225. These signals are input into CPU 223 via amplifier 221. An inverse arc tangent signal is calculated based on sine wave signal 224 and cosine wave signal 225.

However, as shown in FIG. 14, when sine wave signal level 245 and cosine wave signal level 246 are slightly different from each other due to variation in sensitivity of a magnetic detection element and an amplifier, the accuracy of the calculated inverse arc tangent signal is lowered. Then, when switch signal 250 shown in FIG. 9 is turned on so as to set to be sensitivity memory mode, first rotor 203 is rotated by 12° or more and signal levels (sensitivities) 245 and 246 of sine wave signal 244 and cosine wave signal 243 are calculated, which are stored in EEPROM 251. When the rotation angle is calculated, switch signal 250 is turned off, with stored signal levels (sensitivities) 245 and 246, correction is carried out so that the maximum and minimum levels of sine wave signal 243 and cosine wave signal 244 coincide with each other, from which the inverse arc tangent signal from the corrected signal is calculated and the rotation angle is obtained.

Furthermore, second rotor 210 is rotated so that third and fourth rotors 211 and 214 are rotated by 180° or more as shown in FIG. 8, and the signal levels (sensitivities) of sine wave signals 226 and 228 and cosine wave signals 227 and 229 shown in FIGS. 11A and 12A are calculated and stored in EEPROM 251. As shown in FIG. 14, with stored signal levels (sensitivities) 245 and 246, correction is carried out so that the maximum and minimum levels of sine wave signal 243 and cosine wave signal 244 coincide with each other, from which the inverse arc tangent signal from the corrected signal is calculated and the rotation angle is obtained.

Furthermore, when the maximum value and the minimum value of the output signals from first, second and third detection units 213, 216 and 217 shown in FIG. 14 are not present within specified range 247, the output signal does not change due to the temperature characteristic or necessary resolution cannot be obtained.

Therefore, by providing a means (not shown) for detecting that the maximum value and the minimum value of the output signal are present in specified range 247, it may be possible to prevent the detection error of the rotation angle from increasing.

A signal amplitude detector (not shown) for detecting amplitude centers 248 and 249 of the output signals from first, second and third detection units 213, 216 and 217 is used so as to confirm whether or not signals fall within a predetermined range. By making a correction so that amplitude centers 248 and 249 coincide with each other, it is possible to prevent the inconvenience that detection error of the calculated rotation angle is increased. Furthermore, at this time, for example, by executing input at a plurality of times so as to take an average, or by taking an average excluding the maximum and minimum values, an output error can be prevented with a higher accuracy.

Furthermore, by storing output signals from first, second and third detection units 213, 216 and 217 at a certain position or the rotation angle calculated from these output signals, it is possible to uniquely detect a rotation angle from the certain position. Furthermore, by reading an electrical signal at a plurality of times so as to be checked or by sending a signal by a serial signal, even if a wrong signal enters due to a noise or the like, such entering can be eliminated. The same effect can be obtained even when certain position determination signal line 252 uses the same terminal as that of output signal line 232 by switching input and output.

Third Exemplary Embodiment

Next, a third exemplary embodiment is described with reference to FIGS. 15 to 23. The third exemplary embodiment relates to a highly accurate rotation angle detection device for correcting a mechanical error of a gear or an electrical error in a rotation angle detection unit, and a method for correcting the rotation angle.

Figure 15:
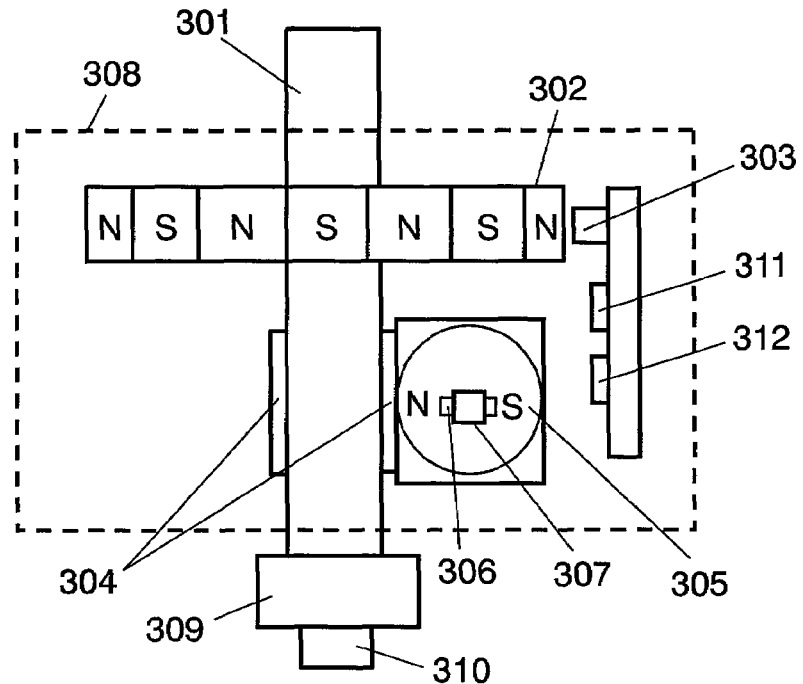
FIG. 15 is a diagram showing a configuration of a rotation angle detection device in accordance with a third exemplary embodiment of the present invention.

FIG. 15 is a diagram showing a configuration of a rotation angle detection device in accordance with the third exemplary embodiment of the present invention. Multipole ring magnet 302 that is a target is connected to axis to be detected 301 (hereinafter, also referred to as "axis 301"). First rotation angle detection unit 303 is disposed in a position facing multipole ring magnet 302. Worm gear 304 is connected to axis 301. With worm gear 304, wheel gear 305 is engaged. In the center portion of wheel gear 305, magnet 306 is disposed. In a position facing magnet 306, second rotation angle detection unit 307 for detecting a rotation angle is disposed. Motor 309 is attached to an end face of axis 301. Encoder 310 detects a mechanical angle of axis 301 of rotation by motor 309.

Figure 16:
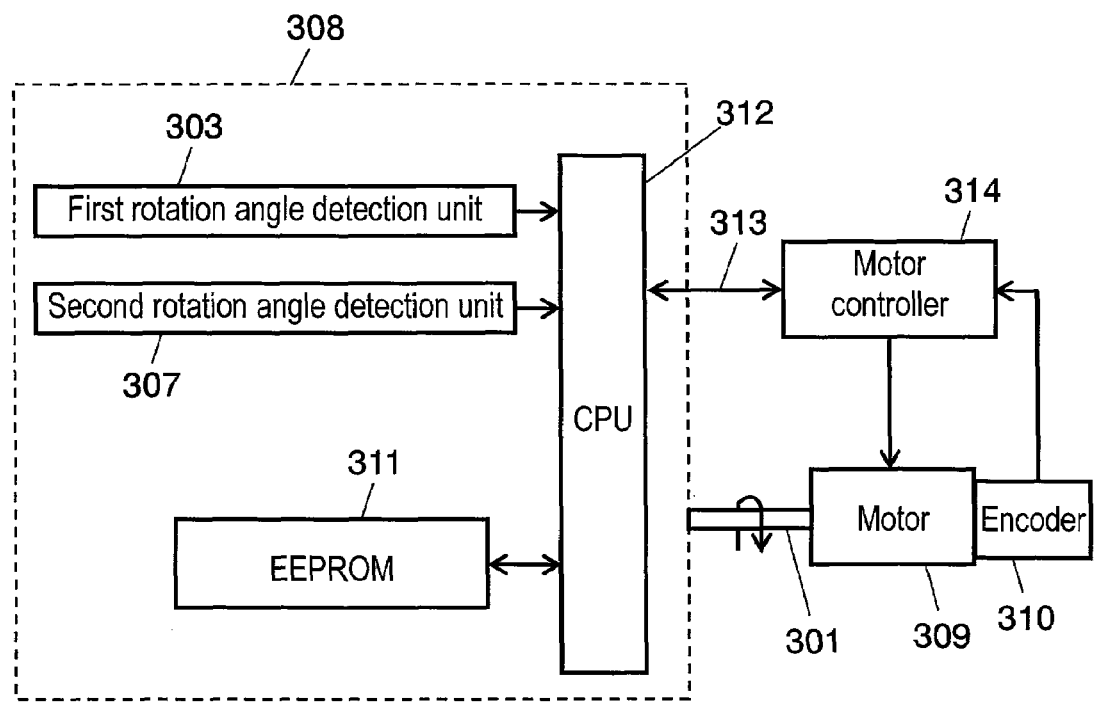
FIG. 16 is a diagram showing a configuration of a correction system of the rotation angle detection device in accordance with the third exemplary embodiment of the present invention.

FIG. 16 is a circuit block diagram showing a correction system of a rotation angle detection device. EEPROM 311 stores a corrected angle, and the like. CPU 312 is coupled to EEPROM 311 and rotation angle detection units 303 and 307, and calculates a rotation angle. Furthermore, CPU 312 and motor controller 314 are linked to each other by serial communication line 313 for sending/receiving an angle signal or an instruction signal, so that signals can be sent and received. To axis 301, motor 309 is attached. The rotation of motor 309 is driven and controlled by motor controller 314 with a high accuracy. The rotation angle of axis 301 is detected by encoder 310 with a high accuracy and the detected rotation angle is sent to motor controller 314.

Figure 17:
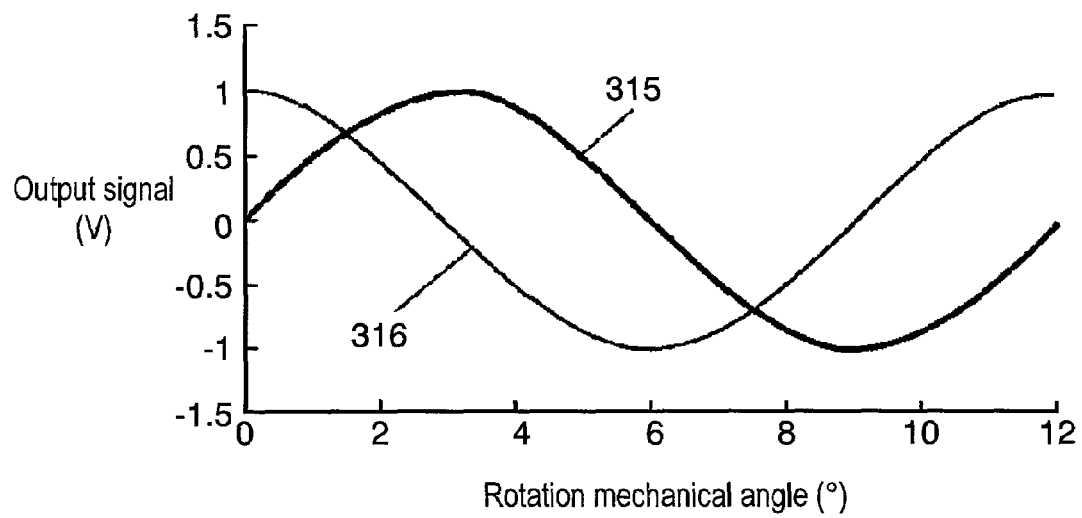
FIG. 17 is a graph showing output signals from the first rotation angle detection unit in accordance with the third exemplary embodiment of the present invention.

FIG. 17 shows signals from the first rotation angle detection unit disposed in a position facing the multipole ring magnet. In FIG. 17, the abscissa indicates a rotation mechanical angle of axis 301. The ordinate indicates output signal from first rotation angle detection unit 303. Sine wave signal 315 and cosine wave signal 316 are output in accordance with the rotation of axis 301.

Figure 18:
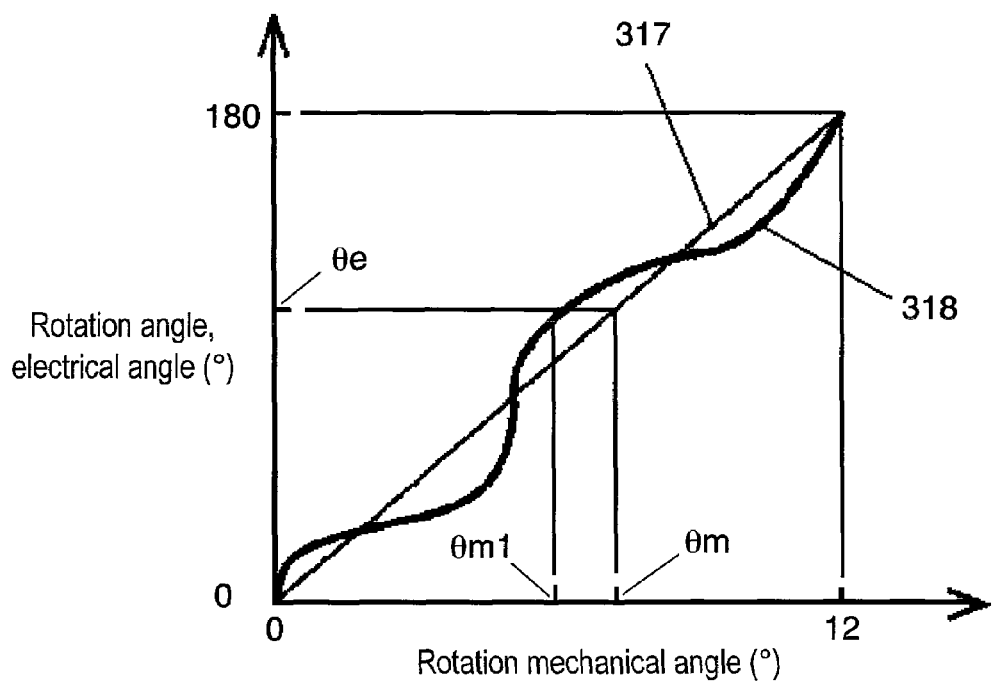
FIG. 18 is a graph showing a relation between a rotation mechanical angle and a rotation electrical angle of an axis to be detected in accordance with the third exemplary embodiment of the present invention.

FIG. 18 shows a correlation characteristic between a rotation electrical angle obtained from one cycle of sine wave signal and cosine wave signal from the first rotation angle detection unit and a rotation mechanical angle of an axis to be detected. In FIG. 18, the abscissa indicates a rotation mechanical angle of axis 301 and the ordinate indicates a rotation electrical angle obtained by sine wave signal 315 and cosine wave signal 316 shown in FIG. 17.

Figure 19:
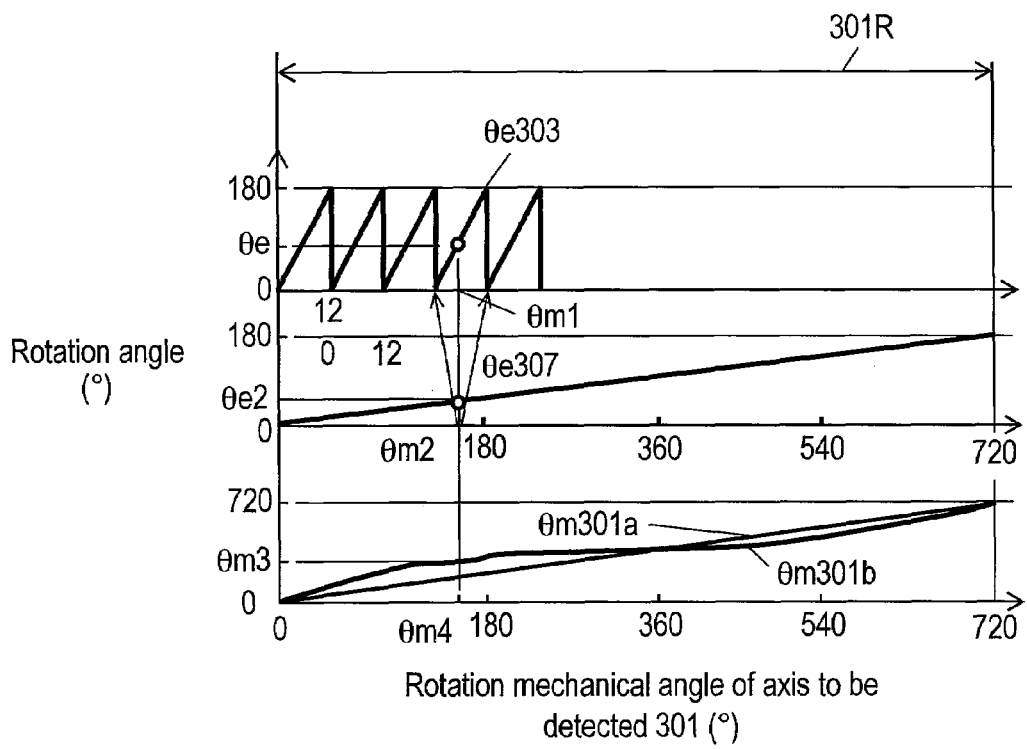
FIG. 19 is a view of the principle for calculating the rotation mechanical angle of the axis to be detected in accordance with the third exemplary embodiment of the present invention.

FIG. 19 is a view showing the principle for calculating a multiple rotation mechanical angle of an axis to be detected from a signal of the first rotation angle detection unit and a signal of the second rotation angle detection unit. In FIG. 19, the abscissa indicates a rotation mechanical angle of axis 301 in rotation angle detection range 301R. The ordinate indicates rotation electrical angle θe303 obtained by first rotation angle detection unit 303 in the upper segment, rotation electrical angle θe307 obtained by second rotation angle detection unit 307 in the middle segment, and θm301a and θm301b of axis 301 calculated by combining rotation electrical angles calculated from signals from first rotation angle detection unit 303 and second rotation angle detection unit 307, respectively. θm301a denotes an ideal value and θm301b denotes an actually measured value, respectively.

Next, a method for detecting a rotation angle of axis 301 with the above-mentioned configuration is described.

In FIG. 15, when axis 301 is rotated, multipole ring magnet 302 connected to axis 301 is rotated. From first rotation angle detection unit 303, it is possible to obtain an output signal corresponding to a rotation angle of multipole ring magnet 302. In the case of the third exemplary embodiment, since the number of magnetic poles of multipole ring magnet 302 is selected to be 30, a rotation mechanical angle per magnetic pole is 12° (360°/30 poles=12°).

With respect to 12° that is the rotation mechanical angle per magnetic pole of multipole ring magnet 302 attached to axis 301, sine wave signal 315 and cosine wave signal 316 that are signals from first rotation angle detection unit 303 change in one cycle (corresponding to 180° of the rotation electrical angle). In FIG. 18, an ideal rotation mechanical angle obtained from rotation electrical angle θe calculated based on the signal of first rotation angle detection unit 303 shown in FIG. 17 changes linearly as shown in rotation mechanical angle θm. However, due to the effect of magnetization variation or deviation of multipole ring magnet 302, variation in sensitivity, variation in position, or the like, of first rotation angle detection unit 303, the rotation mechanical angle obtained from rotation electrical angle θe includes error like rotation mechanical angle θm1 with respect to an ideal rotation mechanical angle θm. As shown in the upper segment of FIG. 19, from the rotation electrical angle θe calculated from first rotation angle detection unit 303, rotation mechanical angle θm1 of axis 301 (0° to 12°) can be obtained with a high accuracy and a high resolution.

On the other hand, worm gear 304 connected to axis 301 rotates and wheel gear 305 also rotates at a constant reduced ratio. In this case, the reduced ratio is set to ¼. The rotation angle of wheel gear 305 is calculated from second rotation angle detection unit 307 for detecting the magnetic field direction of magnet 306. As shown in the middle segment of FIG. 19, from rotation electrical angle θe2 obtained from Sin signal and Cos signal of second rotation angle detection unit 307, it is possible to obtain rotation mechanical angle θm2 in the range from 0° to 720° that is a detection range of axis 301. As shown in the lower segment of FIG. 19, by determining what cycle the value of rotation mechanical angle θm1 obtained from rotation angle detection unit 303 belongs from rotation mechanical angle θm2 obtained by second rotation angle detection unit 307, rotation mechanical angle θm3 of axis 301 is obtained. Also in the lower segment of FIG. 19, due to the same effect described in FIG. 18, the calculated rotation mechanical angle θm3 includes an error with respect to an ideal rotation mechanical angle θm4.

Next, a method for improving the detection accuracy (for reducing errors) of axis 301 in the above-mentioned configuration is described.

Figure 20:
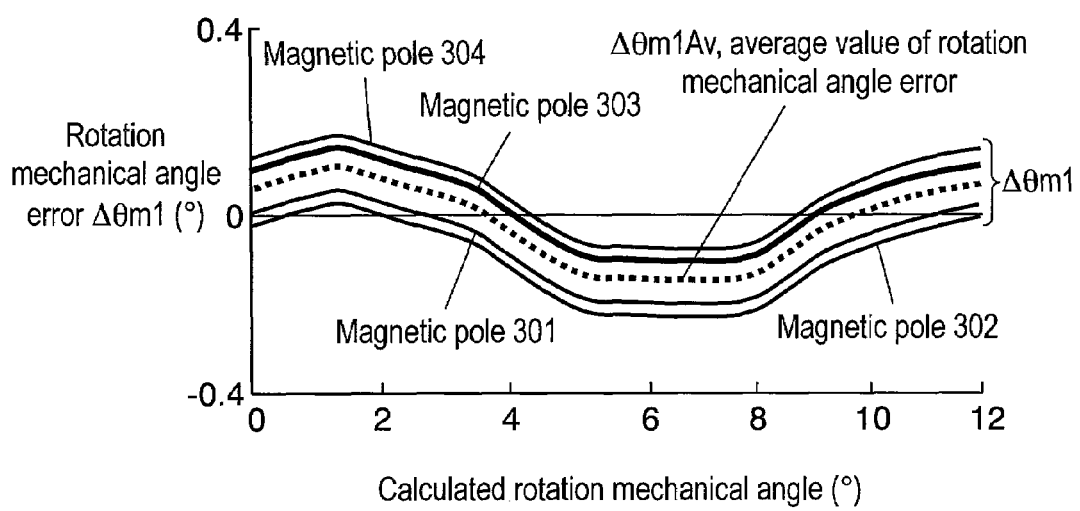
FIG. 20 is a graph showing an example of an error included in a rotation mechanical angle of the calculated axis to be detected in accordance with the third exemplary embodiment of the present invention.

FIG. 20 shows an example of data obtained per rotation mechanical angle corresponding to a magnetic pole pitch of multipole ring magnet included in the calculated rotation mechanical angle of the axis to be detected. In FIG. 20, the abscissa indicates rotation mechanical angle θm1 calculated from rotation electrical angle θe, which has been obtained by inverse transforming a tangent wave signal (=sine wave signal/cosine wave signal) calculated from a sine wave signal and a cosine wave signal that are signals from first rotation angle detection unit 303. The ordinate indicates rotation mechanical error Δθm1 that is a difference between rotation mechanical angle θm by which axis 301 is actually rotated and rotation mechanical angle θm1. In motor controller 314, rotation mechanical angle θm of axis 301 detected by encoder 310 and rotation mechanical angle θm1 of axis 301 calculated by CPU 312 built in rotation angle detection device 308 obtained via serial communication line 313 can be synchronized with each other and stored. In other words, in motor controller 314, rotation mechanical angle error Δθm1 can be determined from the following equation (1) with respect to rotation mechanical angle θm1 of axis 301 calculated by rotation angle detection device 308. When a rotation mechanical angle error is denoted by Δθm1, a calculated rotation mechanical angle of axis 301 is denoted by θm1, and a rotation mechanical angle by which axis 301 actually rotates is denoted by θm, Δθm1 is represented by the following equation (1):

$$\Delta\theta m1 = \theta m1 - \theta m \quad (1)$$

Figure 21:
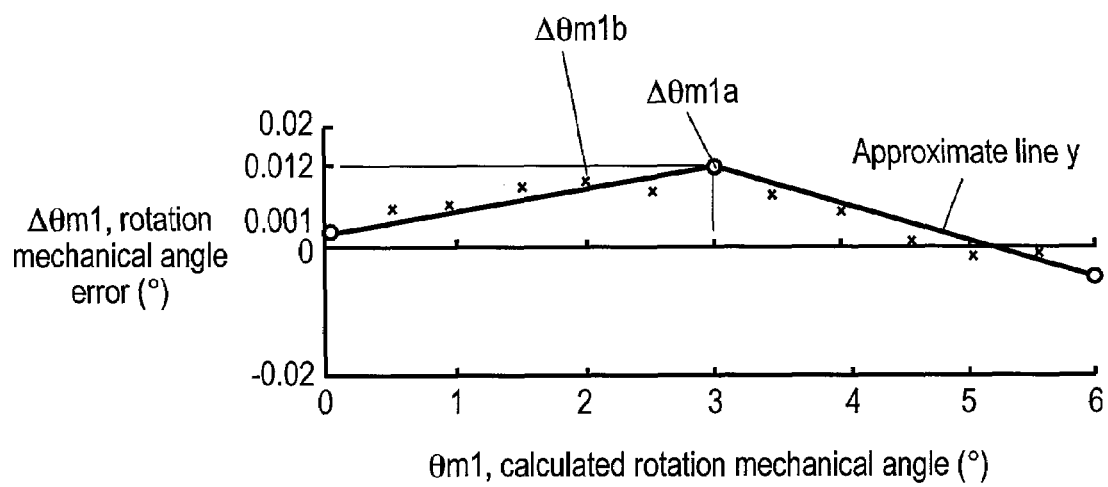
FIG. 21 shows a method for obtaining a corrected approximate line from a rotation mechanical angle error in accordance with the third exemplary embodiment of the present invention.

FIG. 21 shows a method for obtaining a corrected approximate line from the rotation mechanical angle error. In FIG. 21, the abscissa indicates calculated rotation mechanical angle θm1, and the ordinate indicates rotation mechanical angle error Δθm1. A sampled average value is denoted by Δθm1a, and a not-sampled average value is denoted by Δθm1b, respectively. Approximate line y shows characteristic linking values of sampled rotation mechanical angle errors Δθm1a. Data examples of the actually rotation mechanical angle error Δθm1 are shown. Motor controller 314 sends this rotation mechanical angle error Δθm1 to CPU 312 by serial communication line 313. CPU 312 stores this rotation mechanical angle error Δθm1 with respect to rotation mechanical angle θm1 in EEPROM 311. Therefore, CPU 312 can always correct calculated rotation mechanical angle θm1 of axis 301 by using rotation mechanical angle error Δθm1 from equation (2).

That is to say, equation (2) is obtained by modifying equation (1) as follows:

$$\theta m = \theta m1 - \Delta\theta m1 \quad (2)$$

However, in order to store rotation mechanical angle error Δθm1 over the entire range of the rotation detection, large capacity EEPROM 311 is required. When the rotation detection range is 720° and the resolution is 1°, necessary EEPROM capacity is 720 bytes.

If rotation mechanical angle error Δθm1 obtained every predetermined rotation mechanical angle (every three degrees in the example of FIG. 21) is stored in EEPROM 311, the capacity can be reduced to 240 bytes (one-third of 720 bytes). Error Δθm1 of a rotation mechanical angle between predetermined rotation mechanical angles can be estimated from an approximate line obtained from rotation mechanical angle error Δθm1 every three degrees.

Herein, when a rotation mechanical angle in a rotation angle range in three degrees is denoted by x, and the smallest rotation mechanical angle every 3° that is smaller than rotation mechanical angle x is denoted by c. In other words, rotation mechanical angle c<rotation mechanical angle x<rotation mechanical angle (c+3) is satisfied. Furthermore, rotation mechanical angle error m is a rotation mechanical angle error when the rotation mechanical angle is (c+3), and rotation mechanical angle error n is a rotation mechanical angle error when the rotation mechanical angle is c. Based on these values, when approximate line characteristic y of rotation mechanical angle error Δθm1 is calculated, approximate line characteristic y is represented by equation (3).

$$y = (m-n)\cdot(x-c)/3 + n \quad (3)$$

Motor controller 314 rotates motor 309 and allows encoder 310 to synchronize every three degrees of rotation mechanical angle θm1 obtained from serial communication line 313 with rotation mechanical angles θm of axis 301 and gains thereof. In FIG. 21, when rotation mechanical angle θm1 is 0°, rotation mechanical angle error Δθm1(n) is 0.001°, and when rotation mechanical angle θm1 (c+3) is 3°, rotation mechanical angle error Δθm1(m) is 0.012°. As an equation for calculating the rotation mechanical angle error every 0.5° when rotation mechanical angle θm11 is from 0° to 3°, by substituting the above-mentioned values in equation (3), equation (4) is obtained.

$$y = (0.012 - 0.001)\cdot(x-0)/3 + 0.001 = 0.0036\cdot x + 0.001 \quad (4)$$

For example, when rotation mechanical angle θm1 is 1°, rotation mechanical angle error Δθm1 is 0.0046° from equation (4). The rotation mechanical angle error Δθm1 at every one degree when rotation mechanical angle θm1 is in the range from 3° to 6° is obtained by the same method. The rotation mechanical angle θm1 of axis 301 calculated with rotation mechanical angle error Δθm1, which is obtained in the above, is corrected by equation (1).

Furthermore, in order to reduce the capacity of this EEPROM, as shown in FIG. 20, average value Δθm1Av of rotation mechanical angle error Δθm1 of each magnetic pole is calculated from equation (5) at every one magnetic pole pitch (in this exemplary embodiment, every 12°) with respect to calculated rotation mechanical angle θm1. That is to say, when an average value of the rotation mechanical angle error is denoted by $\Delta\theta m1Av$ and a sum of rotation mechanical angle error $\Delta\theta m1$ of 1st to N-th magnetic poles in a certain rotation mechanical angle $\theta m1$ is denoted by $\Sigma\Delta\theta m1$, the average value $\Delta\theta m1Av$ of the rotation mechanical angle error can be obtained from equation (5).

$$\Delta\theta m1Av = \Sigma\Delta\theta m1/N \qquad (5)$$

Rotation mechanical angle error $\Delta\theta m2$ is obtained from average value $\Delta\theta m1Av$ from equation (6). That it to say, the average value of the rotation mechanical angle error is denoted by $\Delta\theta m1Av$, the rotation mechanical angle error is denoted by $\Delta\theta m2$, and the calculated rotation mechanical angle of axis 301 is denoted by $\theta m1$, equation (6) is represented as follows:

$$\Delta\theta m2 = \theta m1 - \theta m - \Delta\theta m1Av \qquad (6)$$

Figure 22:
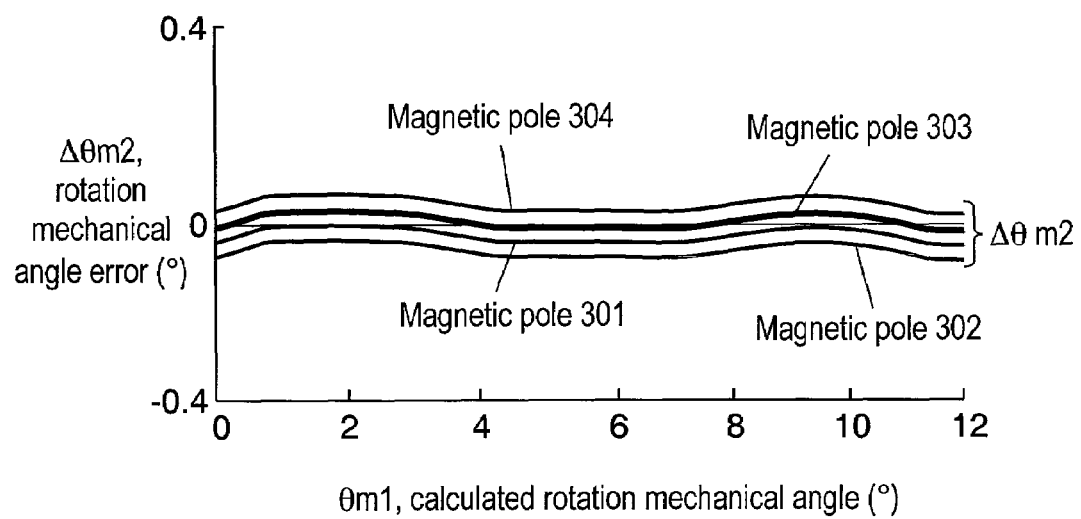
FIG. 22 shows an example of a rotation mechanical angle error after it is corrected with an average value of the rotation mechanical angle error of each magnetic pole in accordance with the third exemplary embodiment of the present invention.

FIG. 22 shows an example of the rotation mechanical angle error data corrected by the average value of the rotation mechanical angle error of magnetic poles. FIG. 22 plots rotation mechanical angle errors $\Delta\theta m2$ calculated by substituting data of FIG. 20 into equation (6). Since the correlation is observed in the generation trend of rotation mechanical angle error $\Delta\theta m1$ of each magnetic pole shown in FIG. 20, with respect to the variation of rotation mechanical angle error $\Delta\theta m1$ of ±0.2°, the variation of rotation mechanical angle error $\Delta\theta m2$ shown in FIG. 22 is reduced to ±0.1° or less.

Since in motor controller 314, rotation mechanical angle $\theta m$ of axis 301 detected by encoder 310 and rotation mechanical angle $\theta m1$ of axis 301 obtained via serial communication line 313 and calculated by CPU 312 built in rotation angle detection device 308 are synchronized with each other and stored, average value $\Delta\theta m1Av$ of rotation mechanical angle error $\Delta\theta m1$ of each magnetic pole, which is calculated from equation (1), can be calculated from equation (5). Average value $\Delta\theta m1Av$ of the rotation mechanical angle errors is sent to CPU 312 by serial communication line 313, and stored in EEPROM 311 by CPU 312. CPU 312 can always correct calculated rotation mechanical angle $\theta m1$ of axis 301 by equation (7) by using average value $\Delta\theta m1Av$ of rotation mechanical angle error although rotation mechanical angle error $\Delta\theta m2$ is included. That is to say, when a rotation mechanical angle actually rotated by axis 301 is denoted by $\theta m$, a rotation mechanical angle error is denoted by $\Delta\theta m2$, and a rotation mechanical angle of calculated axis 301 is denoted by $\theta m1$, equation (7) is expressed as follows.

$$\theta m + \Delta\theta m2 = \theta m1 - \Delta\theta m1Av \qquad (7)$$

Figure 23:
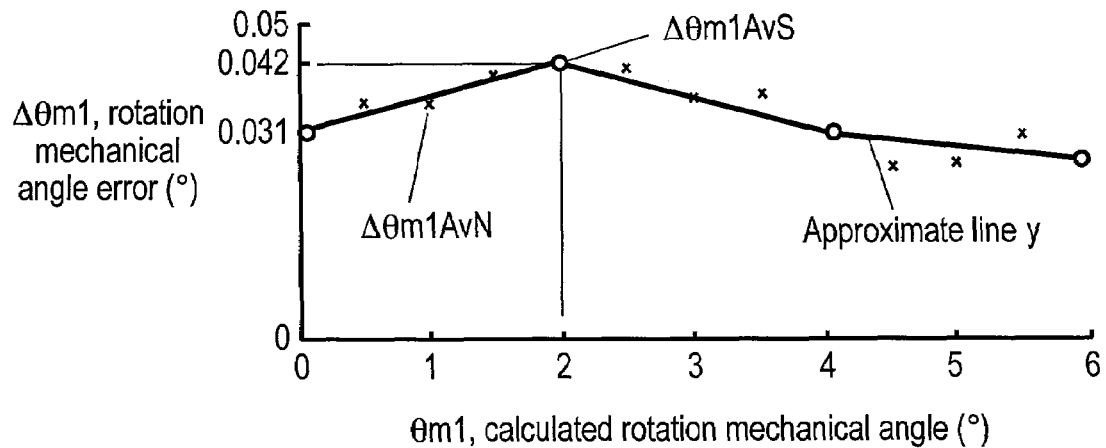
FIG. 23 shows a method for obtaining a corrected approximate linear property for correcting with the average value of the rotation mechanical angle error of each magnetic pole in accordance with the third exemplary embodiment of the present invention.

FIG. 23 is an enlarged view showing a part of FIG. 22. FIG. 23 shows a method for obtaining a corrected approximate line from average values of rotation mechanical angle error of each magnetic pole. A method for reducing the capacity of EEPROM 311 is described with reference to FIG. 23. If average value $\Delta\theta m1Av$ of the rotation mechanical angle error in each magnetic pole as plotted in FIG. 23 is stored in EEPROM 311 at 0.5° intervals of the rotation mechanical angle $\theta m1$ in the range from 0° to 12°, the capacity of 24 is required. When average value $\Delta\theta m1Av$ of the rotation mechanical angle error of each magnetic pole, which is calculated every predetermined rotation mechanical angle (every two degrees, in the example of FIG. 23), is stored in EEPROM 311, the capacity can be reduced to 6 (i.e. 12/2). Average value $\Delta\theta m1Av$ between predetermined rotation mechanical angles can be estimated by an approximate line obtained by average value $\Delta\theta m1Av$ every two degrees.

A certain rotation mechanical angle between two degrees is denoted by x, and the smallest rotation mechanical angle every two degrees that is smaller than rotation mechanical angle x is denoted by c1. In other words, rotation mechanical angle c1<rotation mechanical angle x<rotation mechanical angle (c1+2) is satisfied. Furthermore, average value $\Delta\theta m1Av$ in rotation mechanical angle (c1+2) is m1 and average value $\Delta\theta m1Av$ in rotation mechanical angle c1 is n1. Approximate line y1 of average value $\Delta\theta m1Av$ based on these values is represented by equation (8).

$$y1 = (m1-n1)\cdot(x-c1)/2 + n1 \qquad (8)$$

Motor controller 314 rotates motor 309, gains rotation mechanical angle $\theta m1$ every two degrees from serial communication line 313, and gains rotation mechanical angle $\theta m$ of axis 301 from encoder 310. From rotation mechanical angle $\theta m$, rotation mechanical angle $\theta m1$ and equation (1), rotation mechanical angle error $\Delta\theta m1$ is obtained. Furthermore, by using equation (5), average value $\Delta\theta m1Av$ of the rotation mechanical angle error is obtained.

In FIG. 23, when the value of rotation mechanical angle $\theta m1$ (c1) is 0°, average value $\Delta\theta m1Av$ of the rotation mechanical angle error is 0.031°. When the value of rotation mechanical angle $\theta m1$ (c1+2) is 2°, average value $\Delta\theta m1Av$ (m1) of the rotation mechanical angle error is 0.042°.

As the equation for obtaining average value $\Delta\theta m1Av$ every 0.5° in the rotation mechanical angle $\theta m1$ in the range from 0° to 2°, by substituting the above-mentioned values into equation (8), equation (9) is obtained.

$$\begin{aligned} y1 &= (0.042 - 0.031)\cdot(x-0)/2 + 0.031 \\ &= 0.0055\cdot x + 0.031 \end{aligned} \qquad (9)$$

Herein, for example, when the value of rotation mechanical angle $\theta m1$ is 1°, average value $\Delta\theta m1Av$ is 0.0365° from the equation (9). Values of average value $\Delta\theta m1Av$ every 0.5° in the rotation mechanical angle $\theta m1$ in the range from 2° to 4° are also obtained by the same method. With the thus obtained average value $\Delta\theta m1Av$ of the rotation mechanical angle error, rotation mechanical angle $\theta m1$ of axis 301 is calculated, and rotation mechanical angle $\theta m1$ is corrected by equation (7). When average value $\Delta\theta m1Av$ of the rotation mechanical angle error shown in FIG. 20 is estimated by an approximate line of equation (8) and rotation mechanical angle error $\Delta\theta m2Av$ is calculated from equation (6), substantially the same result as rotation mechanical angle error $\Delta\theta m2$ shown in FIG. 22 is obtained.

Fourth Exemplary Embodiment

Hereinafter, a fourth exemplary embodiment of the present invention is described with reference to FIG. 24.

Figure 24:
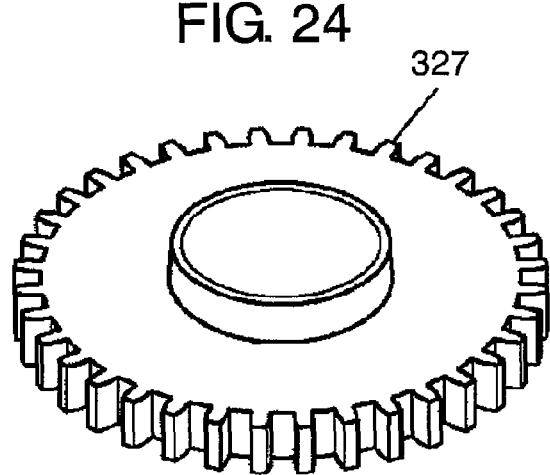
FIG. 24 is a perspective view showing a target in accordance with a fourth exemplary embodiment of the present invention.

FIG. 24 is a perspective view showing a target in accordance with the fourth exemplary embodiment. On the outer circumferential surface of target 327, convex portions made of a magnetic substance are disposed at an identical interval. The rotation angle detection device including target 327 has the same signal shape as that of the first rotation angle detection unit in accordance with the third exemplary embodiment. With this signal, a rotation angle can be calculated. Since the rotation angle detection device using the target in accordance with the fourth exemplary embodiment has the same configuration and operation as those in the rotation angle detection device in accordance with the above-mentioned third exemplary embodiment, the description thereof is omitted herein.

Fifth Exemplary Embodiment

Hereinafter, a fifth exemplary embodiment of the present invention is described with reference to FIG. 25.

Figure 25:
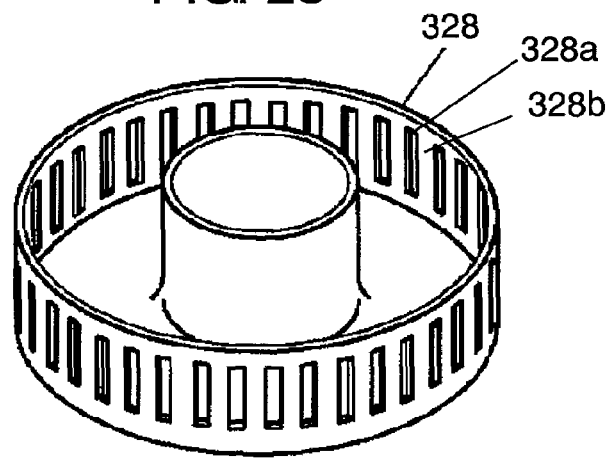
FIG. 25 is a perspective view showing a target in accordance with a fifth exemplary embodiment of the present invention.
Figure 26:
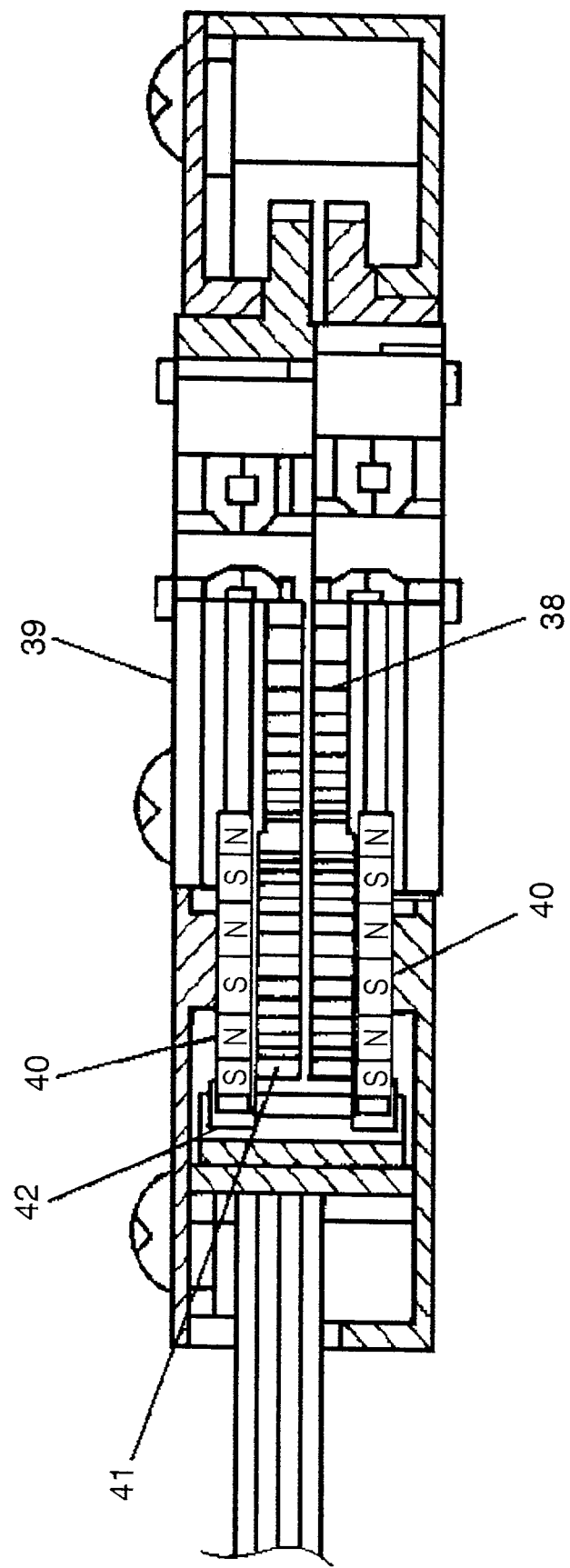
FIG. 26 shows a conventional rotation angle detection device.

FIG. 25 is a perspective view showing a target in accordance with the fifth exemplary embodiment. Target 328 has a cylindrical portion and concave portions 328a and not-concave portions 328b are disposed in identical intervals on the outer circumferential surface of the cylindrical portion. This rotation angle detection device including target 328 has the same signal shape as that of the first rotation angle detection unit in accordance with the third exemplary embodiment. With this signal, a rotation angle can be calculated. Since the rotation angle detection device using the target in accordance with the fifth exemplary embodiment has the same configuration and operation as those in the rotation angle detection device in accordance with the above-mentioned third exemplary embodiment, the description thereof is omitted herein.

As mentioned above, the rotation angle detection device in accordance with the fifth exemplary embodiment has an advantage that in the detection range or in the rotation range corresponding to each magnetic pole width of a multipole ring magnet, by a method for storing the corrected angle with respect to the calculated rotation angle of axis 301 in EEPROM 311, or by a method for storing the corrected angle in EEPROM 311, reduction of the accuracy in rotation angle detection due to a magnetic error, a mechanical error, and an electrical error of the multipole ring magnet or rotation angle detection unit is corrected by using an EEPROM with less capacity, and thereby the accuracy of the detected rotation angle of the axis to be detected can be improved.

INDUSTRIAL APPLICABILITY

An absolute rotation angle detection device of the present invention can detect an absolute rotation angle with a simple configuration and with a high accuracy and a high resolution. Therefore, the absolute rotation angle detection device is useful for application in an absolute rotation angle used in vehicle power steering, and the like.

Furthermore, a rotation angle detection device of the present invention is used in, for example, a vehicle power steering and can detect a multiple rotation angle with a simple configuration and with a high accuracy and a high resolution.

In addition, a rotation angle correction method of the rotation angle detection device in accordance with the present invention has an advantage that multiple rotation of an axis to be detected can be detected with a simple configuration using an EEPROM with less capacity with a high accuracy. The method is suitable to be used as a rotation angle correction method of a rotation angle detection device used in, for example, a vehicle power steering. Therefore, industrial applicability thereof is high.

The invention claimed is:

1. A rotation angle detection device, comprising:
   a multi-rotatable first rotor holding a first target connected to an input axis and having an outer circumferential surface to which magnetic poles of alternate polarities are magnetized at an identical interval;
   a first detector for detecting a rotation angle of the first rotor, which is disposed facing the magnetic pole of the first target;
   a second rotor coupled to the input axis and having a gear;
   a third rotor coupled to the gear of the second rotor and having a gear provided with a second target in a center portion;
   a second detector for detecting a rotation angle of the third rotor;
   a fourth rotor coupled to the gear of the third rotor and having a gear provided with a third target in a center portion; and
   a third detector for detecting a rotation angle of the fourth rotor.

2. The rotation angle detection device of claim 1, wherein the first, second and third detectors include magnetic detection elements, and the second and third targets include single pole magnets.

3. The rotation angle detection device of claim 2, comprising a means for determining a certain position of the magnetic detection elements as the first, second and third detectors, wherein values of a sine wave signal and a cosine wave signal at the certain position are stored so as to detect an absolute rotation angle from the certain position.

4. The rotation angle detection device of claim 2, comprising a means for determining a certain position of the magnetic detection elements as the first to third detectors, wherein an absolute rotation angle calculated from a sine wave signal and a cosine wave signal at the certain position is stored so as to detect an absolute rotation angle from the certain position.

5. The rotation angle detection device of claim 1, wherein a multiple rotation angle of the second rotor is calculated by combining a difference in a rotation angle between the third rotor and the fourth rotor, which are sequentially coupled to the gear of the second rotor and have gears having different numbers of teeth, and a rotation angle of the third rotor to the fourth rotor.

6. The rotation angle detection device of claim 1, wherein a multiple rotation angle of the first rotor is calculated based on a difference in a rotation angle between the third rotor and the fourth rotor, which are sequentially coupled to the gear of the second rotor and have gears having different numbers of teeth, a rotation angle of the third rotor to the fourth rotor, and a rotation angle of the first rotor obtained from the first target.

7. The rotation angle detection device of claim 1, comprising a rotation angle difference detection unit for comparing a rotation angle calculated by the first detector with a rotation angle calculated by the second or third detector, and detecting whether a difference between the rotation angles is within a specified value.

8. The rotation angle detection device of claim 7, comprising a sensitivity determination unit for determining whether the sensitivity is within a specified value when the sensitivities of the magnetic detection elements as the first, second and third detectors are stored.

9. The rotation angle detection device of claim 1, comprising a nonvolatile memory for storing sensitivities of a sine wave signal and a cosine wave signal output from the first, second and third detectors after the first, second and third rotors are incorporated, wherein correction of the sine wave signal and the cosine wave signal is carried out with respective sensitivities every time an electric power is turned on.

10. The rotation angle detection device of claim 1, comprising a nonvolatile memory for storing a center of an amplitude of an output signal from the magnetic detection elements as the first to third detectors, wherein correction of the sine wave signal and the cosine wave signal is carried out at each center of the amplitude every time an electric power is turned on.

11. The rotation angle detection device of claim 1, comprising a means for confirming whether the center of the amplitude of an output signal from the magnetic detection elements as the first to third detectors is within a specified value.

12. An absolute rotation angle detection device, comprising:
- a first rotor holding a target connected to an input axis and having an outer circumferential surface to which magnetic poles of alternate polarities are magnetized at an identical interval, and having a multi-rotatable gear;
- a first detector for detecting a rotation angle of the first rotor;
- a second rotor coupled to the gear of the first rotor, rotated at a lower speed than the first rotor, and having a magnet on a center portion; and
- a second detector for detecting a rotation angle of the second rotor.

13. The absolute rotation angle detection device of claim 12, wherein the first and second detectors include magnetic detection elements disposed in positions facing the target and the magnet.

14. The absolute rotation angle detection device of claim 12, comprising a nonvolatile memory for storing sensitivities of a sine wave signal and a cosine wave signal output from the first and second detectors, wherein the first and second rotors are incorporated, and then the sine wave signal and the cosine wave signal are corrected with the respective sensitivities every time an electric power is turned on.

15. The absolute rotation angle detection device of claim 14, comprising a sensitivity detection unit for detecting whether the sensitivity is within a specified value when the sensitivities of the respective magnetic detection elements are stored.

16. The absolute rotation angle detection device of claim 14, comprising a signal amplitude detection unit for detecting whether a center of an amplitude of an output signal is within a specified value when the sensitivities of the respective magnetic detection elements are stored.

17. The absolute rotation angle detection device of claim 14, comprising a signal detection unit for detecting the sine wave signal and the cosine wave signal at a plurality of times when the sensitivities of the respective magnetic detection elements are stored.

18. The absolute rotation angle detection device of claim 14, comprising a position determination unit for determining a certain position of each magnetic detection element, wherein values of the sine wave signal and the cosine wave signal at the certain position are stored so as to detect an absolute rotation angle from the certain position.

19. A rotation angle correction method of a rotation angle detection device including a first rotation angle detection unit disposed in a position facing a target connected to an axis to be detected; a mechanism for reducing a rotation speed of the axis to be detected; and a second rotation angle detection unit for detecting a rotation angle whose rotation speed is reduced, wherein a rotation angle of the axis to be detected is calculated from signals of the first rotation angle detection unit and the second rotation angle detection unit,
the method comprising:
- by using a motor for rotating the axis to be detected, a motor controller for controlling a rotation angle of the motor, and an encoder for detecting the rotation angle of the motor,
- storing a difference between the rotation angle of the axis to be detected actually rotated by the motor and the calculated rotation angle of the axis to be detected obtained by the first and the second rotation angle detection units as a corrected angle in a nonvolatile memory; and
- correcting the calculated rotation angle of the axis to be detected with the corrected angle.

20. The method of claim 19, wherein the corrected angle is stored in a nonvolatile memory every predetermined rotation angle in an entire detection range and the calculated rotation angle of the axis to be detected is corrected; and between the predetermined rotation angles, correction is carried out by using a corrected angle estimated from an approximate line obtained from the corrected angles stored before and after the predetermined rotation angle.

21. The method of claim 19, wherein the target is a multi-pole ring magnet to which magnetic poles of reverse polarities are magnetized at an identical interval in a circumferential direction of an axis to be detected; an average value of each magnetic pole error in a rotation range corresponding to each magnetic pole width is stored as a corrected angle common to each magnetic pole in a nonvolatile memory; and a calculated rotation angle of the axis to be detected is corrected with the corrected angle.

22. The method of claim 21, wherein, in a rotation range corresponding to the target interval, a corrected angle common to each target is stored in a nonvolatile memory every predetermined rotation angle, and the calculated rotation angle of the axis to be detected is corrected; and between the predetermined rotation angles, correction is carried out by using a corrected angle estimated from an approximate line obtained from the corrected angles stored before and after the predetermined rotation angle.

23. The method of claim 19, wherein the target is a gear having convex portions disposed at an identical interval in a circumferential direction of the axis to be detected; an average value of each tooth error in a rotation range corresponding to each tooth width is stored as a corrected angle common to each tooth in a nonvolatile memory; and a calculated rotation angle of the axis to be detected is corrected with the corrected angle.

24. The method of claim 23, wherein, in a rotation range corresponding to the target interval, a corrected angle common to each target is stored in a nonvolatile memory every predetermined rotation angle, and the calculated rotation angle of the axis to be detected is corrected; and between the predetermined rotation angles, correction is carried out by using a corrected angle estimated from an approximate line obtained from the corrected angles stored before and after the predetermined rotation angle.

25. The method of claim 19, wherein the target has concave portions disposed in a way in which non-concave portions are provided at an identical interval in a circumferential direction of the axis to be detected; an average value of errors of the concave portions in a rotation range corresponding to each concave portion width is stored as a corrected angle common to each concave portion in a nonvolatile memory; and a calculated rotation angle of the axis to be detected is corrected with the corrected angle.

26. The method of claim 25, wherein, in a rotation range corresponding to the target interval, a corrected angle common to each target is stored in a nonvolatile memory every predetermined rotation angle, and the calculated rotation angle of the axis to be detected is corrected; and between the predetermined rotation angles, correction is carried out by using a corrected angle estimated from an approximate line obtained from the corrected angles stored before and after the predetermined rotation angle.

* * * * *